United States Patent
Huang

(10) Patent No.: US 10,996,434 B2
(45) Date of Patent: May 4, 2021

(54) IRIS LENS ASSEMBLY

(71) Applicant: Zhejiang Sunny Optical Co., Ltd, Ningbo (CN)

(72) Inventor: Lin Huang, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 374 days.

(21) Appl. No.: 15/772,868

(22) PCT Filed: Oct. 26, 2017

(86) PCT No.: PCT/CN2017/107848
§ 371 (c)(1),
(2) Date: May 2, 2018

(87) PCT Pub. No.: WO2018/223582
PCT Pub. Date: Dec. 13, 2018

(65) Prior Publication Data
US 2020/0257083 A1     Aug. 13, 2020

(30) Foreign Application Priority Data

Jun. 5, 2017 (CN) .......................... 201710411509.9
Jun. 5, 2017 (CN) .......................... 201720638445.1

(51) Int. Cl.
*G02B 13/00* (2006.01)
*G02B 5/00* (2006.01)
(Continued)

(52) U.S. Cl.
CPC ......... *G02B 13/0035* (2013.01); *G02B 5/005* (2013.01); *G02B 5/208* (2013.01); *G02B 9/16* (2013.01)

(58) Field of Classification Search
CPC .. G02B 13/00; G02B 13/001; G02B 13/0015; G02B 13/002; G02B 13/0035; G02B 9/14; G02B 9/16; G02B 5/20; G02B 5/208

See application file for complete search history.

(56) References Cited

U.S. PATENT DOCUMENTS

| 2010/0259838 A1* | 10/2010 | Tsai et al. ..................... 359/716 |
| 2014/0184880 A1* | 7/2014 | Ahn et al. ..................... 348/342 |
| 2016/0227082 A1* | 8/2016 | Hsueh et al. ...... G02B 13/0035 |

FOREIGN PATENT DOCUMENTS

| CN | 104090347 A | 10/2014 |
| CN | 105137571 A | 12/2015 |

(Continued)

OTHER PUBLICATIONS

Translation of Tw201131197A (Year: 2011).*

*Primary Examiner* — Robert E. Tallman
(74) *Attorney, Agent, or Firm* — Sughrue Mion, PLLC

(57) ABSTRACT

The present disclosure discloses an iris lens assembly. The iris lens assembly comprises sequentially a first lens, a second lens, a third lens and a filter from an object side to an image plane along an optical axis. An aperture diaphragm is arranged between the first lens and the second lens. The first lens has a positive refractive power, an object side surface of the first lens is a convex surface and an image side surface of the first lens is a concave surface. The second lens has a negative refractive power. The third lens has a positive refractive power or a negative refractive power. The filter is an infrared (IR) filter, and a bandpass wave band of the filter ranges from 750 nm to 900 nm.

9 Claims, 14 Drawing Sheets

(51) Int. Cl.
G02B 5/20 (2006.01)
G02B 9/16 (2006.01)

(56) References Cited

FOREIGN PATENT DOCUMENTS

| | | |
|---|---|---|
| CN | 105445903 A | 3/2016 |
| CN | 205809392 U | 12/2016 |
| CN | 106443972 A | 2/2017 |
| CN | 107015350 A | 8/2017 |

* cited by examiner

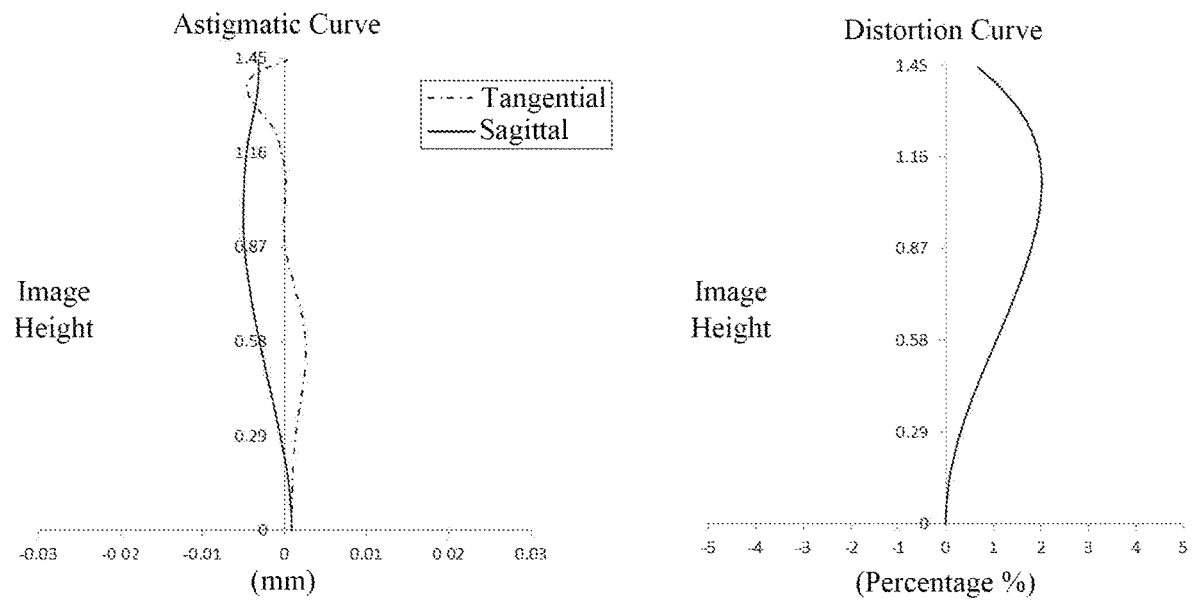
Fig. 6B
Fig. 6C
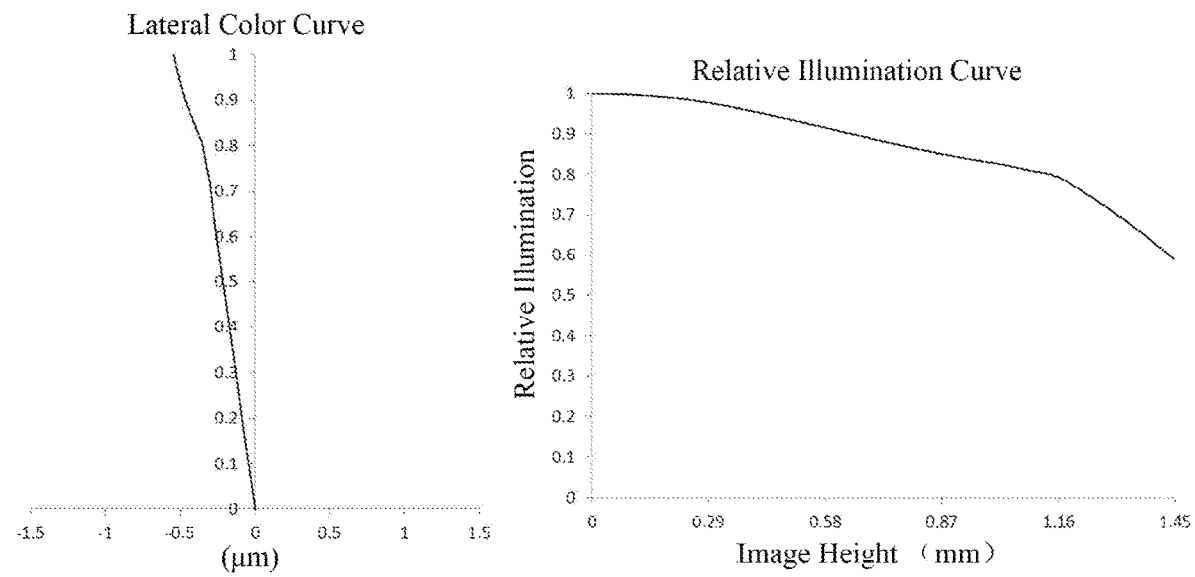
Fig. 6D
Fig. 6E

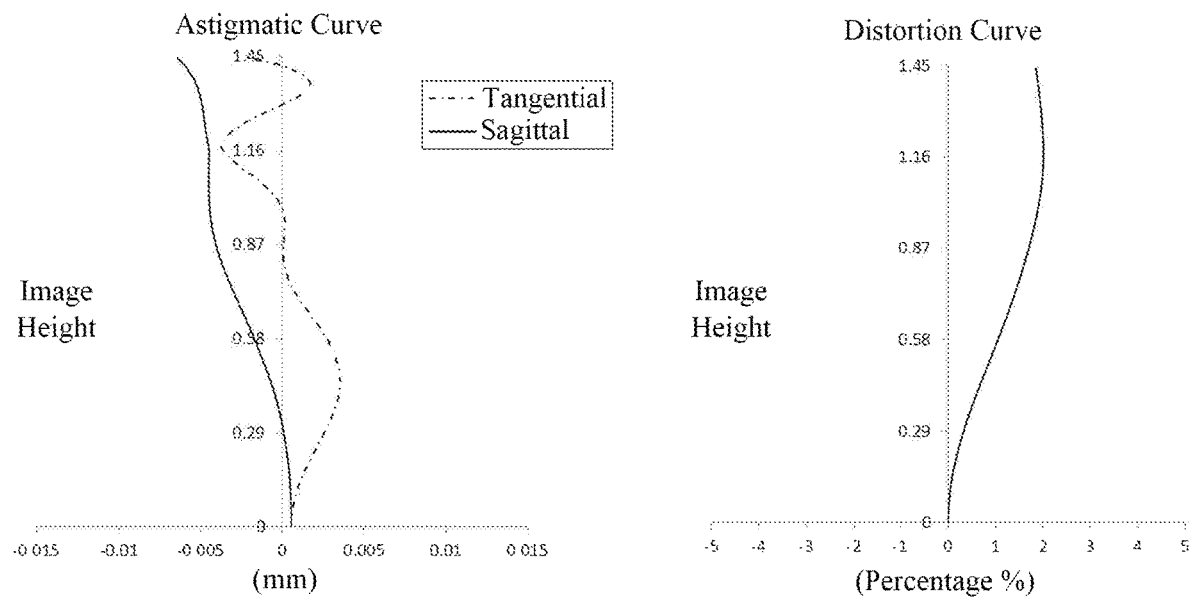
Fig. 8B
Fig. 8C
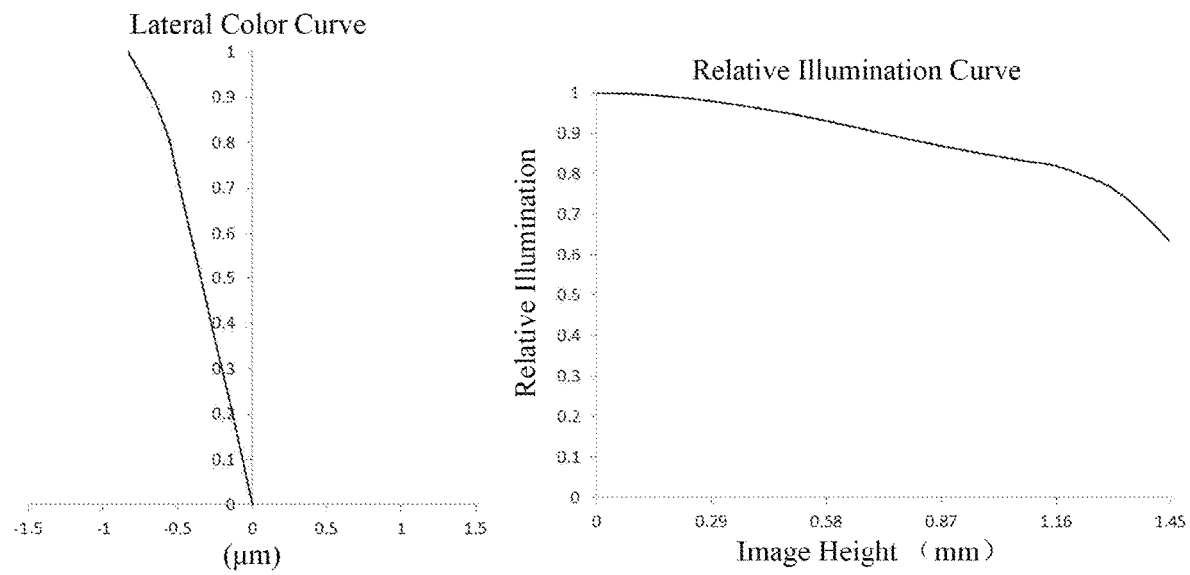
Fig. 8D
Fig. 8E

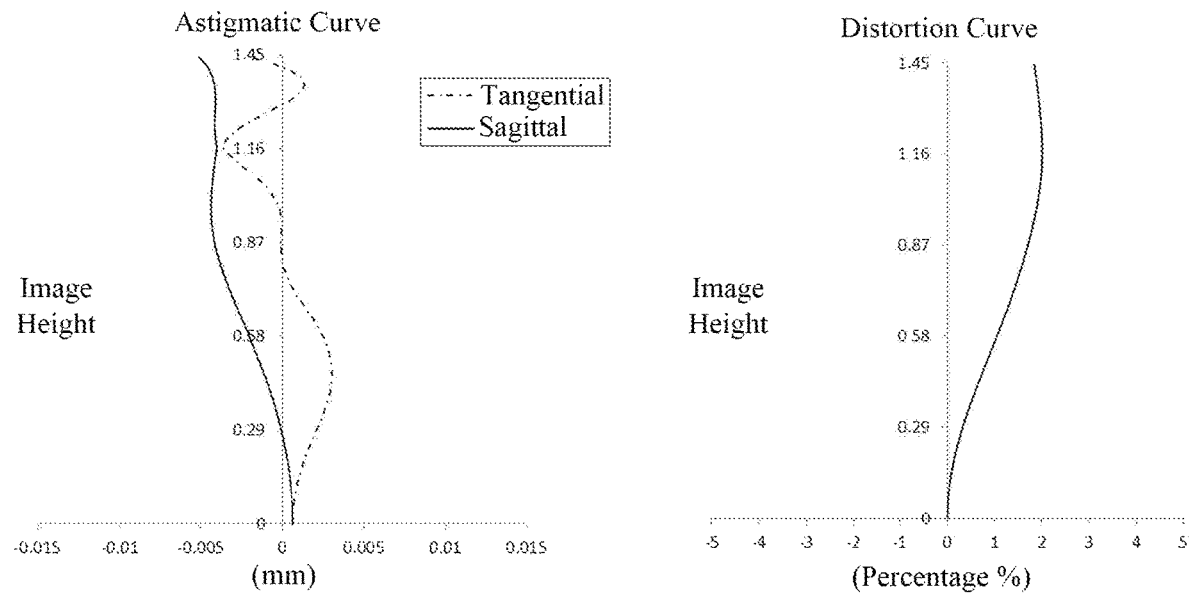
Fig. 10B
Fig. 10C
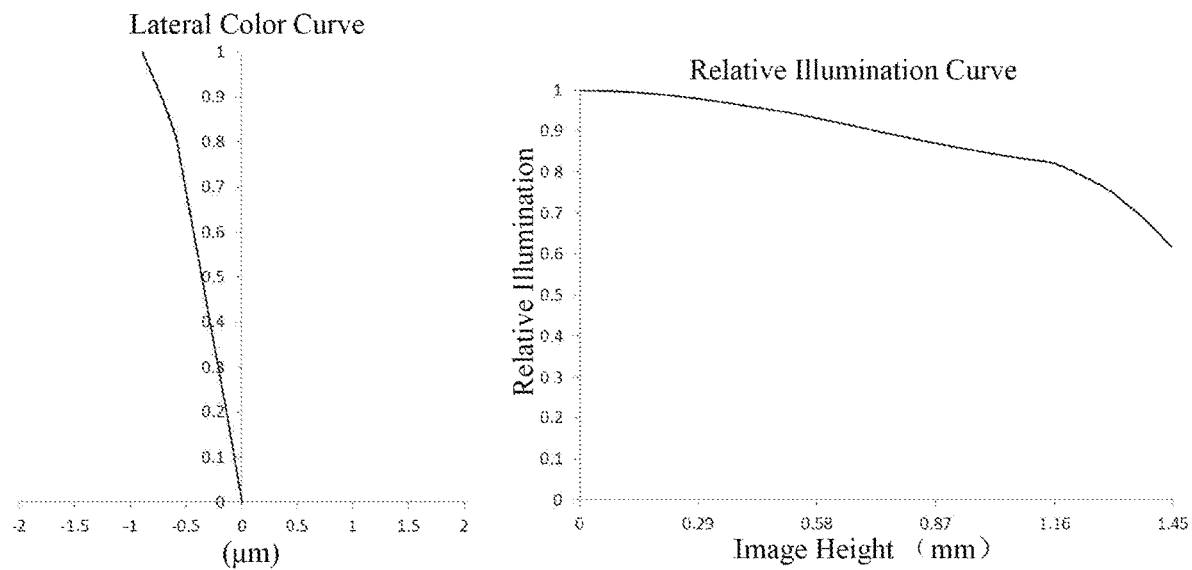
Fig. 10D
Fig. 10E

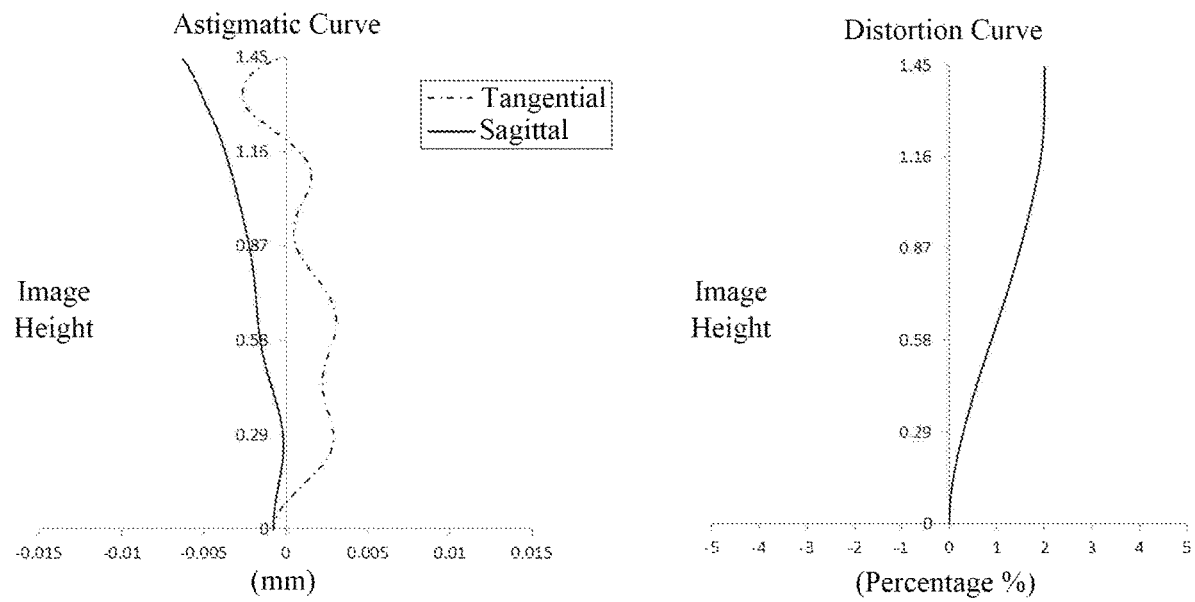
Fig. 12B
Fig. 12C
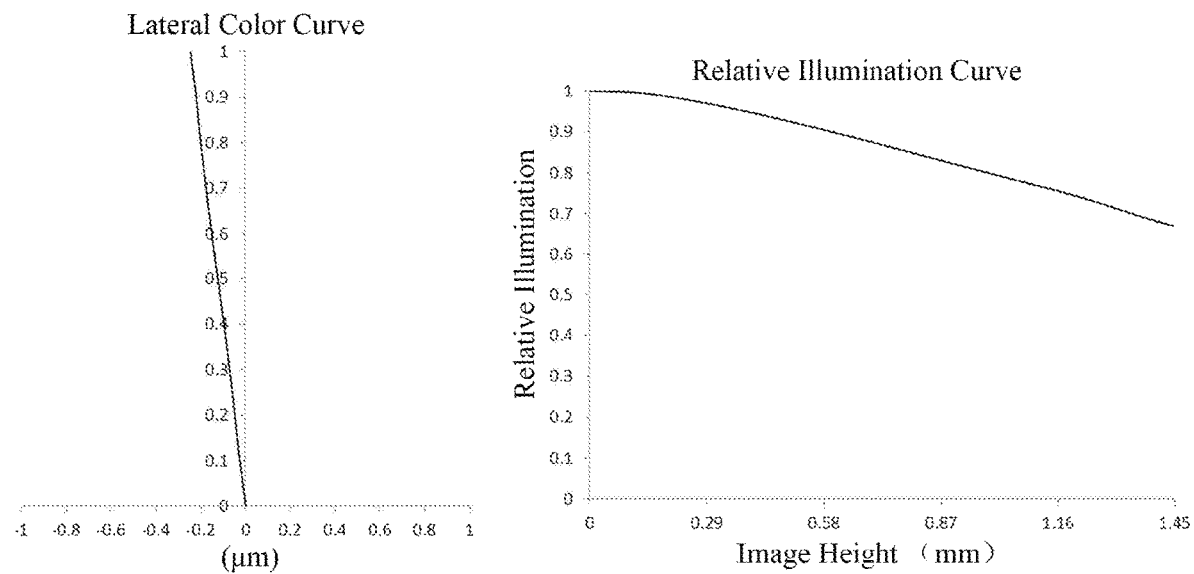
Fig. 12D
Fig. 12E

… (1)

IRIS LENS ASSEMBLY

CROSS-REFERENCE TO RELATED APPLICATIONS

This application is a National Stage of International Application No. PCT/CN2017/107848 filed Oct. 26, 2017, related to and claims priorities and rights from Chinese Patent Application No. 201710411509.9, filed with the State Intellectual Property Office (SIPO) on Jun. 5, 2017, and Chinese Patent Application No. 201720638445.1 filed with the SIPO on Jun. 5, 2017, the disclosures of which are hereby incorporated by reference in their entireties.

TECHNICAL FIELD

The present invention relates to an iris lens assembly, and more specifically to an iris lens assembly including three lenses.

BACKGROUND

In recent years, with the development of science and technology, portable electronic products are gradually emerging, and portable electronic products having camera function are increasingly liked by people. Therefore, market demands for camera lens assemblies suitable for the portable electronic products are gradually increasing. Currently, an often used photosensitive element in a camera lens assembly is generally a CCD (charge-coupled device) or a CMOS (complementary metal-oxide semiconductor). With the improvement of semiconductor processing technology, optical systems tend to have higher pixels, and pixel sizes on the chips become smaller and smaller. Accordingly, higher requirements on high image quality and the miniaturization of the lens assemblies used in combination have been brought forward.

In the biometric field in particular, with the development of the biometric technology, requirements on iris lens assemblies also become higher and higher, to correspond with the application in different products. The iris lens assembly applied in this technology not only needs to ensure a compact structure, but also needs to have a higher brightness and resolution, to improve the recognition accuracy of the lens assembly.

Therefore, there is a need to provide an iris lens assembly having a compact structure, high image quality and high recognition accuracy.

SUMMARY

Technical solutions provided by the present disclosure solve at least some of the above-mentioned technical problems.

An iris lens assembly is provided according to an aspect of the present disclosure. The iris lens assembly includes sequentially a first lens, a second lens, a third lens and a filter from an object side to an image plane along an optical axis. An aperture diaphragm may be arranged between the first lens and the second lens. The first lens may have a positive refractive power, an object side surface of the first lens may be a convex surface and an image side surface of the first lens may be a concave surface. The second lens may have a negative refractive power. The third lens has a positive refractive power or a negative refractive power. The filter is an infrared (IR) filter and a bandpass wave band of the filter ranges from 750 nm to 900 nm.

An iris lens assembly is provided according to another aspect of the present disclosure. The iris lens assembly includes sequentially a first lens, a second lens, and a third lens from an object side to an image plane along an optical axis. The first lens may have a positive refractive power, an object side surface of the first lens may be a convex surface and an image side surface of the first lens may be a concave surface. The second lens may have a negative refractive power. The third lens has a positive refractive power or a negative refractive power. A distance from the object side surface of the first lens to the image plane of the iris lens assembly on the optical axis TTL and ImgH, ImgH being half a diagonal length of an effective pixel area on the image plane of the iris lens assembly, may satisfy: TTL/ImgH<2.6.

In an implementation, the iris lens assembly may further include an aperture diaphragm arranged between the first lens and the second lens.

In an implementation, a center thickness of the first lens on the optical axis CT1 and the distance from the object side surface of the first lens to the image plane of the iris lens assembly on the optical axis TTL may satisfy: 0.1<CT1/TTL<0.2.

In an implementation, the center thickness of the first lens on the optical axis CT1 and a center thickness of the third lens on the optical axis CT3 may satisfy: 1<CT1/CT3<2.1.

In an implementation, a radius of curvature of the object side surface of the first lens R1 and a radius of curvature of the image side surface of the first lens R2 may satisfy: −2<(R1+R2)/(R1−R2)<−1.

In an implementation, an effective focal length of the second lens f2 and an effective focal length of the third lens f3 may satisfy: |f2/f3|<0.4.

In an implementation, the distance from the object side surface of the first lens to the image plane of the iris lens assembly on the optical axis TTL and a total effective focal length of the iris lens assembly f may satisfy: 0.8<TTL/f<1.1.

In an implementation, an effective radius of the aperture diaphragm DTS and an effective radius of an object side surface of the second lens DT21 may satisfy: 1≤DTS/DT21<1.5.

In an implementation, an effective radius of the image side surface of the first lens DT12 and the effective radius of the object side surface of the second lens DT21 may satisfy: 1≤DT12/DT21<1.5.

In an implementation, at least one of an image side surface and the object side surface of the second lens may be a smoothly meniscus-curved surface.

In the present disclosure, multiple lenses (e.g., three lenses) are used. By reasonably distributing refractive powers and surface types of various lenses, axial spacing distances between the various lenses, and so on, the iris lens assembly may possess at least one of the following advantages:

compacting a structure of the lens assembly;
realizing miniaturization of the lens assembly;
improving brightness of the lens assembly;
improving recognition accuracy of the lens assembly;
correcting various aberrations; and
improving resolution and image quality of the lens assembly.

BRIEF DESCRIPTION OF THE DRAWINGS

By describing non-limiting implementations below in detail with reference to the accompanying drawings, other features, objectives and advantages of the present invention will be more apparent. In the accompanying drawings:

FIGS. 6A-6E respectively illustrate a longitudinal aberration curve, an astigmatic curve, a distortion curve, a lateral color curve and a relative illumination curve of the iris lens assembly according to Embodiment 3;

FIGS. 8A-8E respectively illustrate a longitudinal aberration curve, an astigmatic curve, a distortion curve, a lateral color curve and a relative illumination curve of the iris lens assembly according to Embodiment 4;

FIGS. 10A-10E respectively illustrate a longitudinal aberration curve, an astigmatic curve, a distortion curve, a lateral color curve and a relative illumination curve of the iris lens assembly according to Embodiment 5;

FIGS. 12A-12E respectively illustrate a longitudinal aberration curve, a astigmatic curve, a distortion curve, a lateral color curve and a relative illumination curve of the iris lens assembly according to Embodiment 6;

DETAILED DESCRIPTION OF EMBODIMENTS

Figure 1:
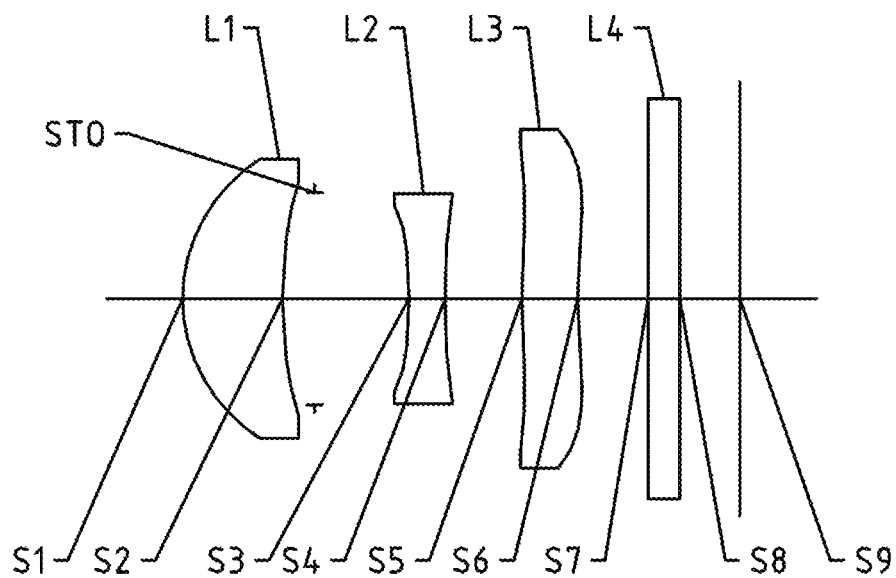
FIG. 1 illustrates a schematic structural diagram of an iris lens assembly according to Embodiment 1 of the present disclosure.

Various aspects of the present disclosure will be described in more detail with reference to the accompanying drawings, so as to better understand the present disclosure. It should be appreciated that the detailed description is merely an explanation for the exemplary embodiments of the present disclosure, rather than a limitation to the scope of the present disclosure in any way. The same reference numerals designate the same elements throughout this specification. The statement "and/or" includes any and all combinations of one or more of the associated listed items.

It should be noted that, in the specification, statements, such as "first," "second" and "third" are merely used to distinguish one characteristic from another characteristic, rather than representing any limitations to the characteristics. Thus, a first lens discussed below also could be termed as a second lens or a third lens without departing from the teachings of the present disclosure.

In the accompanying drawings, for the convenience of description, thicknesses, dimensions and shapes of lenses have been slightly exaggerated. Specifically, spherical or aspheric shapes shown in the accompanying drawings are illustrated by examples. That is, spherical or aspheric shapes are not limited to the spherical or aspheric shapes shown in the accompanying drawings. The accompanying drawings are merely examples, not strictly drawn to scale.

In addition, a paraxial area indicates an area near an optical axis. In the present disclosure, a surface closest to the object in each lens is referred to as an object side surface, and a surface closest to an image plane in each lens is referred to as an image side surface.

It should be further understood that the terms "comprising," "including," "having" and variants thereof, when used in this specification, specify the presence of stated characteristics, entireties, steps, operations, elements and/or components, but do not exclude the presence or addition of one or more other characteristics, entireties, steps, operations, elements, components and/or combinations thereof. In addition, expressions, such as "at least one of," when preceding a list of elements, modify the entire list of elements rather than an individual element in the list. Further, the use of "may," when describing embodiments of the present disclosure, relates to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

An iris lens assembly according to exemplary implementations of the present disclosure includes, for example, three lenses (i.e., a first lens, a second lens and a third lens). These lenses are arranged in sequence from an object side to an image plane along an optical axis.

In exemplary implementations, the first lens may have a positive refractive power, an object side surface of the first lens is a convex surface, and an image side surface of the first lens is a concave surface. The second lens may have a negative refractive power. The third lens may have a positive refractive power or a negative refractive power. At least one of an object side surface and the image side surface of the second lens is a smoothly meniscus-curved surface.

In use, an aperture diaphragm may be arranged between the first lens and the second lens, to improve an image quality of the lens assembly. In the exemplary implementations, an effective radius of the aperture diaphragm DTS and an effective radius of the object side surface of the second lens DT21 may satisfy: 1≤DTS/DT21<1.5, and more specifically, DTS and DT21 may further satisfy: 1.01≤DTS/DT21≤1.30.

An effective radius of the image side surface of the first lens DT12 and the effective radius of the object side surface of the second lens DT21 may satisfy: 1≤DT12/DT21<1.5, and more specifically, DT12 and DT21 may further satisfy: 1.09≤DT12/DT21≤1.42.

Alternatively, the iris lens assembly may further include a filter arranged between the third lens and the image plane. The filter may be an infrared (IR) filter and a bandpass wave band of the filter may range from about 750 nm to about 900 nm, and the bandpass wave band of the filter may further range from about 790 nm to about 830 nm. The infrared (IR) filter may be used to filter noise from visible light to achieve a high performance recognition effect of the lens assembly.

A center thickness of the first lens on the optical axis CT1 and a distance from the object side surface of the first lens to the image plane on the optical axis TTL may satisfy: 0.1<CT1/TTL<0.2, and more specifically, CT1 and TTL may further satisfy: 0.17≤CT1/TTL≤0.19. The center thickness of the first lens on the optical axis CT1 and a center thickness of the third lens on the optical axis CT3 may satisfy: 1<CT1/CT3<2.1, and more specifically, CT1 and CT3 may further satisfy: 1.02≤CT1/CT3≤2.03. By reasonably arranging the center thicknesses of various lenses, the improvement of the image performance of the lens assembly is implemented while the miniaturization is achieved.

A radius of curvature of the object side surface of the first lens R1 and a radius of curvature of the image side surface of the first lens R2 may satisfy: −2<(R1+R2)/(R1−R2)<−1, and more specifically, R1 and R2 may further satisfy: −1.96≤(R1+R2)/(R1−R2)≤−1.83. By reasonably arranging shapes of the lenses and in combination of the diaphragm arranged between the first lens and the second lens, effects of reducing aberration and improving the resolution of the lens assembly can be achieved.

An effective focal length of the second lens f2 and an effective focal length of the third lens f3 may satisfy: |f2/f3|<0.4, and more specifically, f2 and f3 may further satisfy: 0.00≤|f2/f3|≤0.37. By balancing the distribution of the refractive powers, the performance of high recognition accuracy can be realized while the resolution of the lens assembly is ensured.

The distance from the object side surface of the first lens to the image plane of the iris lens assembly on the optical axis TTL and ImgH, ImgH being half a diagonal length of an effective pixel area on the image plane of the iris lens assembly, may satisfy: TTL/ImgH<2.6, and more specifically, TTL and ImgH may further satisfy: 2.56≤TTL/ImgH≤2.59. By reasonably allocating TTL and ImgH of the iris lens assembly, the size of the lens assembly can be reduced as much as possible while the iris recognition accuracy is satisfied, thereby achieving the miniaturization of the lens assembly.

The distance from the object side surface of the first lens to the image plane of the iris lens assembly on the optical axis TTL and a total effective focal length of the iris lens assembly f may satisfy: 0.8<TTL/f<1.1, and more specifically, TTL and f may further satisfy: 0.88≤TTL/f≤1.08.

The iris lens assembly according to the above implementations of the present disclosure may use multiple lenses. By reasonably distributing refractive powers, surface types and center thicknesses of various lenses, and axial spacing distances between the various lenses, and so on, the structure of the lens assembly can be effectively compacted, the miniaturization of the lens assembly can be ensured and the image quality can be improved, so that the iris lens assembly is more conducive to the production and processing and can be applied to portable electronic products. In the implementations of the present disclosure, at least one of mirror surfaces of the lenses is an aspheric mirror surface. An aspheric lens is characterized in that its curvature continuously changes from the lens center to the periphery. In contrast to a spherical lens having a constant curvature from the lens center to the periphery, the aspheric lens has a better radius of curvature characteristic, and has advantages of reducing the distortion aberration and the astigmatism aberration. The use of the aspheric lens can eliminate as much as possible the aberration that occurs during the imaging, thereby improving the image quality.

However, it should be understood by those skilled in the art that, in a situation without departing from the technical solution sought to be protected by the present disclosure, the number of lenses forming the lens assembly may be changed, to obtain various results and advantages described in the specification of the present disclosure. For instance, in the descriptions of the implementations, an iris lens assembly having three lenses is described as an example, but the iris lens assembly is not limited to include three lenses. If necessary, the iris lens assembly may also include other numbers of lenses.

Specific embodiments applicable to the iris lens assembly of the above implementations will be further described below with reference to the accompanying drawings.

Embodiment 1

An iris lens assembly of Embodiment 1 according to the present disclosure is described below with reference to FIGS. 1-2E. FIG. 1 illustrates a schematic structural diagram of the iris lens assembly according to Embodiment 1 of the present disclosure.

As shown in FIG. 1, the iris lens assembly includes, along an optical axis, three lenses L1-L3 arranged in sequence from an object side to an image plane. A first lens L1 has an object side surface S1 and an image side surface S2, a second lens L2 has an object side surface S3 and an image side surface S4, and a third lens L3 has an object side surface S5 and an image side surface S6. Alternatively, the iris lens assembly may further include a filter L4 having an object side surface S7 and an image side surface S8. The filter L4 is an infrared (IR) filter. A bandpass wave band of the filter may range from about 750 nm to about 900 nm, and the bandpass wave band of the filter may further range from about 790 nm to about 830 nm. In the iris lens assembly of this embodiment, an aperture diaphragm STO for limiting light beams may also be arranged between the first lens L1 and the second lens L2, to improve the image quality. Light from an object sequentially passes through the surfaces S1 to S8 and finally forms an image on the image plane S9.

Table 1 shows the surface type, the radius of curvature, the thickness, the material and the conic coefficient of each lens of the iris lens assembly in Embodiment 1. The radius of curvature and the thickness are shown in millimeters (mm).

TABLE 1

| Durface Number | Surface Type | Radius of Curvature | Thickness | Material Refractive Index | Abbe Number | Conic Coefficient |
|---|---|---|---|---|---|---|
| OBJ | spherical | infinite | 260.0000 | | | |
| S1 | aspheric | 1.0787 | 0.6628 | 1.53 | 55.8 | −0.1731 |
| S2 | aspheric | 3.3332 | 0.2137 | | | 8.1417 |
| STO | spherical | infinite | 0.6264 | | | |
| S3 | aspheric | −4.1379 | 0.2400 | 1.62 | 23.5 | −80.6900 |
| S4 | aspheric | 6.9371 | 0.5090 | | | −79.0817 |
| S5 | aspheric | 4.1306 | 0.3700 | 1.53 | 55.8 | −28.7202 |
| S6 | aspheric | 2.9826 | 0.4680 | | | −59.7366 |
| S7 | spherical | infinite | 0.2100 | 1.52 | 64.2 | |
| S8 | spherical | infinite | 0.3999 | | | |
| S9 | spherical | infinite | | | | |

Referring to Table 1, the center thickness of the first lens L1 on the optical axis CT1 and the distance from the object side surface S1 of the first lens L1 to the image plane S9 on the optical axis TTL satisfy: CT1/TTL=0.18. The center thickness of the first lens L1 on the optical axis CT1 and the center thickness of the third lens L3 on the optical axis CT3 satisfy: CT1/CT3=1.79. The radius of curvature R1 of the object side surface S1 of the first lens L1 and the radius of curvature R2 of the image side surface S2 of the first lens L1 satisfy: (R1+R2)/(R1−R2)=−1.96.

In this embodiment, an iris lens assembly having three lenses is used as an example. By reasonably distributing focal lengthes and surface types of the lenses, the total length of the lens assembly is effectively reduced, a structure of the lens assembly is effectively compacted, and the recognition accuracy of the lens assembly is effectively improved. Meanwhile, various aberrations are corrected, the resolution and image quality of the lens assembly are improved. A surface type of each aspheric surface x is defined by the following formula:

$$x = \frac{ch^2}{1+\sqrt{1-(k+1)c^2h^2}} + \sum A_i h^i. \quad (1)$$

When an aspheric surface is at a height h along the optical axis, x is a distance sagittal height to a vertex of the aspheric surface; c is a paraxial curvature of the aspheric surface, and c=1/R (i.e., the paraxial curvature cis a reciprocal of the radius of curvature R in Table 1); k is a conic coefficient (being given in Table 1); and Ai is a correction coefficient of an i-th order of the aspheric surface. Table 2 below shows high-order coefficients $A_4, A_6, A_8, A_{10}, A_{12}, A_{14}, A_{16}, A_{18}$ and $A_{20}$ that can be applied to aspheric mirror surfaces S1–S6 in Embodiment 1.

Table 3 shows the total effective focal length f of the iris lens assembly of Embodiment 1, the effective focal lengths f1–f3 of the lenses, the distance TTL from the object side surface S1 of the first lens L1 to the image plane S9 on the optical axis, and the half of a diagonal length of an effective pixel area ImgH on the image plane S9.

TABLE 3

| Parameter | f(mm) | f1(mm) | f2(mm) | f3(mm) | TTL(mm) | ImgH(mm) |
|---|---|---|---|---|---|---|
| Numerical Value | 3.99 | 2.74 | −4.13 | −22.86 | 3.70 | 1.45 |

Figure 3:
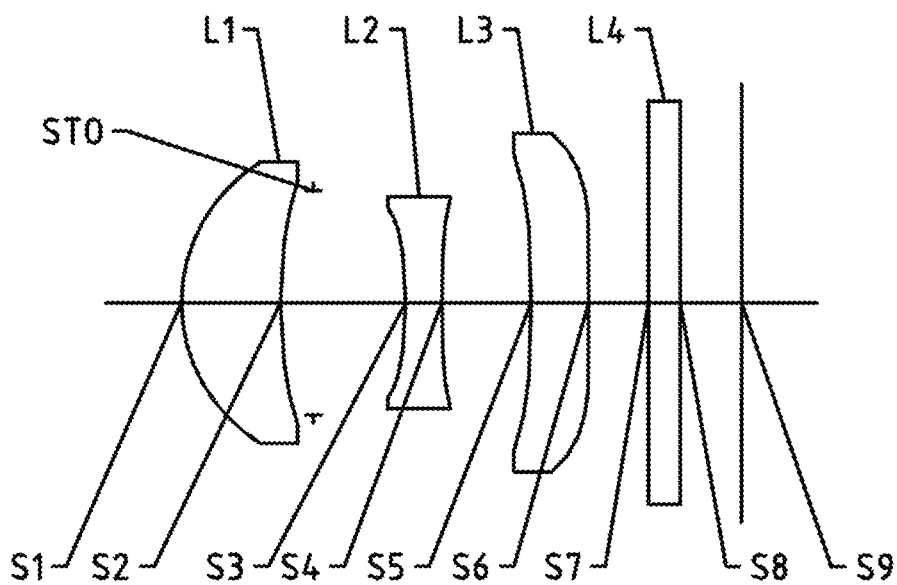
FIG. 3 illustrates a schematic structural diagram of an iris lens assembly according to Embodiment 2 of the present disclosure.

According to FIG. 3, the distance from the object side surface S1 of the first lens L1 to the image plane S9 on the optical axis TTL and ImgH, ImgH being half the diagonal length of the effective pixel area on the image plane S9, satisfy: TTL/ImgH=2.56. The effective focal length f2 of the second lens L2 and the effective focal length f3 of the third lens L3 satisfy: |f2/f3|=0.18. The distance from the object side surface S1 of the first lens L1 to the image plane S9 on the optical axis TTL and the total effective focal length of the iris lens assembly f satisfy: TTL/f=0.93.

In Embodiment 1, an effective radius of the aperture diaphragm DTS and an effective radius of the object side surface of the second lens DT213 satisfy: DTS/DT21=1.14. An effective radius of the image side surface of the first lens DT12 and the effective radius of the object side surface of the second lens DT21 satisfy: DT12/DT21=1.26.

Figure 2A:
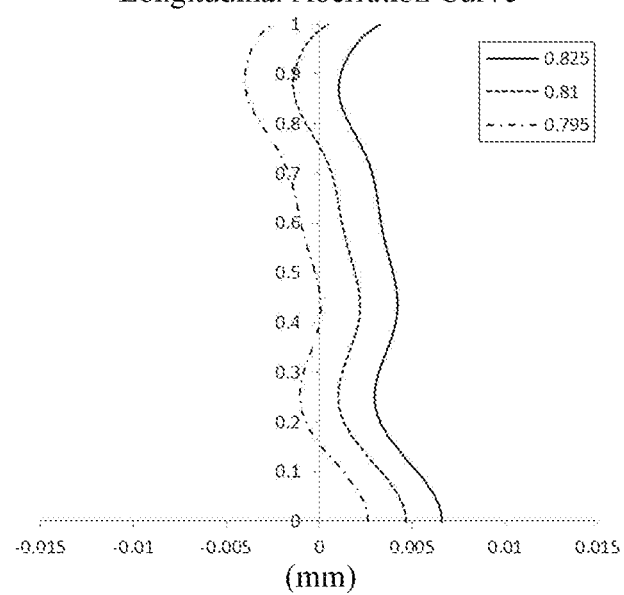
FIGS. 2A-2E respectively illustrate a longitudinal aberration curve, an astigmatic curve, a distortion curve, a lateral color curve and a relative illumination curve of the iris lens assembly according to Embodiment 1.
Figure 2B:
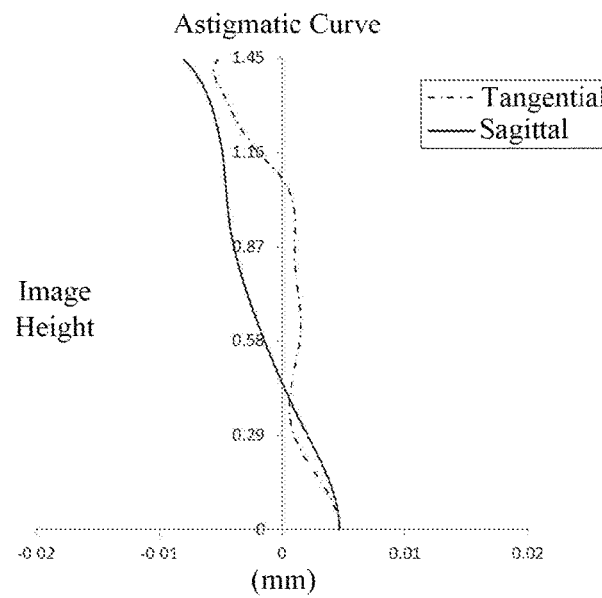
Figure 2C:
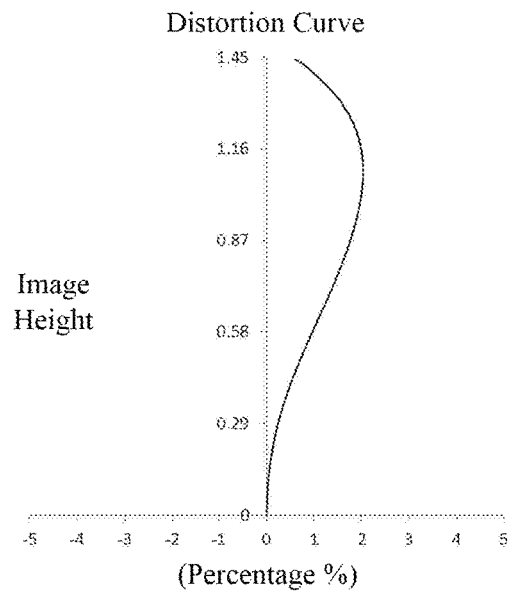

FIG. 2A illustrates a longitudinal aberration curve of the iris lens assembly according to Embodiment 1, representing deviations of focal points of light of different wavelengths converged after passing through the iris lens assembly. FIG. 2B illustrates an astigmatism curve of the iris lens assembly according to Embodiment 1, representing a curvature of a tangential image plane and a curvature of a sagittal image plane. FIG. 2C illustrates a distortion curve of the iris lens

TABLE 2

Figure 2D:
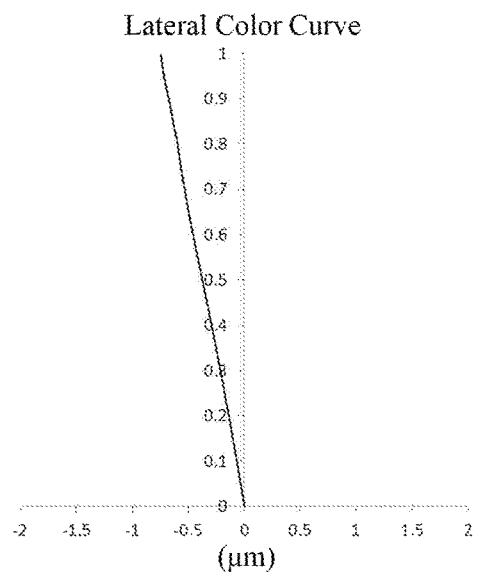
Figure 2E:
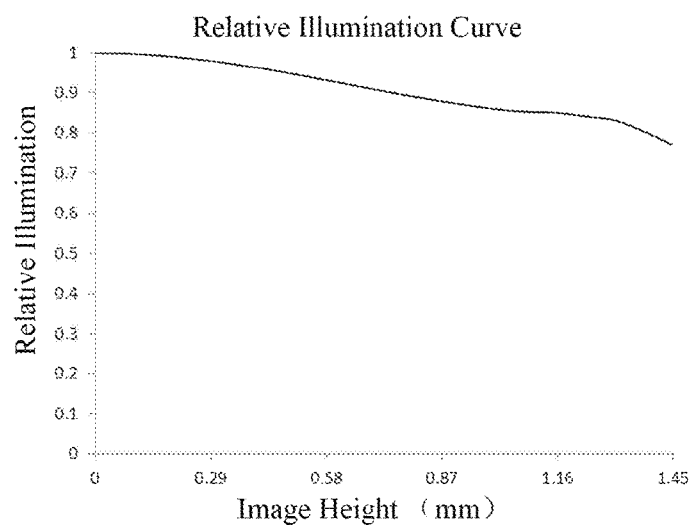

| Surface Number | A4 | A6 | A8 | A10 | A12 | A14 | A16 | A18 | A20 |
|---|---|---|---|---|---|---|---|---|---|
| S1 | 8.4712E−03 | −2.8224E−02 | 1.9090E−01 | −5.3700E−01 | 8.9031E−01 | −7.6240E−01 | 2.7562E−01 | 0.0000E+00 | 0.0000E+00 |
| S2 | 1.2429E−03 | 1.3716E−03 | −5.3600E−02 | 1.6527E−01 | −2.4724E−01 | 1.1800E−01 | 2.2018E−02 | 0.0000E+00 | 0.0000E+00 |
| S3 | −3.3043E−01 | −1.6406E−01 | 6.2603E+00 | −7.4508E+01 | 4.5913E+02 | −1.7219E+03 | 3.8353E+03 | −4.6581E+03 | 2.3513E+03 |
| S4 | 1.6886E−02 | 4.4916E−01 | −3.1635E+00 | 2.0083E+01 | −8.5412E+01 | 2.2958E+02 | −3.7936E+02 | 3.5312E+02 | −1.4178E+02 |
| S5 | −1.9969E−01 | 1.3844E−01 | −8.9328E−02 | 3.5129E−01 | −7.6846E−01 | 7.8726E−01 | −4.1699E−01 | 1.1157E−01 | −1.1978E−02 |
| S6 | −1.4191E−02 | −5.0458E−01 | 1.1723E+00 | −1.7111E+00 | 1.5743E+00 | −8.7259E−01 | 2.3882E−01 | −8.5778E−03 | −6.3401E−03 | assembly according to Embodiment 1, representing amounts of distortion at different viewing angles. FIG. 2D illustrates a lateral color curve of the iris lens assembly according to Embodiment 1, representing deviations of different image heights on an image plane after light passes through the iris lens assembly. FIG. 2E illustrates a relative illumination curve of the iris lens assembly according to Embodiment 1, representing relative illumination corresponding to different image heights on the image plane. It can be known that according to FIGS. 2A-2E the iris lens assembly provided in Embodiment 1 can achieve a good image quality.

Embodiment 2

An iris lens assembly according to Embodiment 2 of the present disclosure is described below with reference to FIGS. 3-4E. In this embodiment and the following embodiments, for the purpose of brevity, the description of parts similar to those in Embodiment 1 will be omitted. FIG. 3 illustrates a schematic structural diagram of the iris lens assembly according to Embodiment 2 of the present disclosure.

As shown in FIG. 3, the iris lens assembly includes, along an optical axis, three lenses L1-L3 arranged in sequence from an object side to an image plane. A first lens L1 has an object side surface S1 and an image side surface S2, a second lens L2 has an object side surface S3 and an image side surface S4, and a third lens L3 has an object side surface S5 and an image side surface S6. Alternatively, the iris lens assembly may further include a filter L4 having an object side surface S7 and an image side surface S8. The filter L4 is an infrared (IR) filter. A bandpass wave band of the filter may range from about 750 nm to about 900 nm, and the bandpass wave band of the filter may further range from about 790 nm to about 830 nm. In the iris lens assembly of this embodiment, an aperture diaphragm STO for limiting light beams may also be arranged between the first lens L1 and the second lens L2, to improve the image quality. Light from an object sequentially passes through the surfaces S1 to S8 and finally forms an image on the image plane S9.

Table 4 shows the surface type, the radius of curvature, the thickness, the material and the conic coefficient of each lens of the iris lens assembly in Embodiment 2. The radius of curvature and the thickness are shown in millimeters (mm). Table 5 shows high-order coefficients $A_4, A_6, A_8, A_{10}, A_{12}, A_{14}, A_{16}, A_{18}$ and $A_{20}$ that can be applied to aspheric mirror surfaces S1-S6 in Embodiment 2. Table 6 shows the total effective focal length f of the iris lens assembly of Embodiment 2, the effective focal lengths f1-f3 of the lenses, the distance TTL from the object side surface S1 of the first lens L1 to the image plane S9 on the optical axis, and the half of a diagonal length of an effective pixel area ImgH on the image plane S9. A surface type of each aspheric surface may be defined by the formula (1) provided in Embodiment 1.

TABLE 4

| Surface Number | Surface Type | Radius of Curvature | Thickness | Material Refractive Index | Abbe Number | Conic Coefficient |
|---|---|---|---|---|---|---|
| OBJ | spherical | infinite | 262.0320 | | | |
| S1 | aspheric | 1.0698 | 0.6546 | 1.53 | 55.8 | −0.1681 |
| S2 | aspheric | 3.3359 | 0.2186 | | | 8.1895 |
| STO | spherical | infinite | 0.6093 | | | |
| S3 | aspheric | −3.1802 | 0.2400 | 1.53 | 55.8 | −51.9098 |
| S4 | aspheric | 9.7241 | 0.5898 | | | 50.0000 |
| S5 | aspheric | −28.1548 | 0.3806 | 1.53 | 55.8 | −99.0000 |
| S6 | aspheric | 9.3792 | 0.3971 | | | −4.5303 |
| S7 | spherical | infinite | 0.2100 | 1.52 | 64.2 | |
| S8 | spherical | infinite | 0.4057 | | | |
| S9 | spherical | infinite | | | | |

TABLE 5

| Surface Number | A4 | A6 | A8 | A10 | A12 | A14 | A16 | A18 | A20 |
|---|---|---|---|---|---|---|---|---|---|
| S1 | 9.7586E−03 | −3.9484E−02 | 2.5426E−01 | −7.1854E−01 | 1.1774E+00 | −9.9313E−01 | 3.5138E−01 | 0.0000E+00 | 0.0000E+00 |
| S2 | 2.3256E−03 | 8.4437E−04 | −5.2525E−02 | 1.6642E−01 | −2.4773E−01 | 1.1505E−01 | 1.7662E−02 | 0.0000E+00 | 0.0000E+00 |
| S3 | −3.7017E−01 | 7.2549E−03 | 4.1295E+00 | −5.9492E+01 | 3.8406E+02 | −1.4576E+03 | 3.2196E+03 | −3.8246E+03 | 1.8623E+03 |
| S4 | 7.3719E−02 | 4.5052E−01 | −4.7410E+00 | 3.5718E+01 | −1.7065E+02 | 5.2064E+02 | −9.8221E+02 | 1.0426E+03 | −4.7472E+02 |
| S5 | −1.7713E−01 | 1.9197E−01 | −6.6137E−01 | 2.0258E+00 | −3.6132E+00 | 3.6728E+00 | −2.0757E+00 | 6.0689E−01 | −7.1664E−02 |
| S6 | −2.0459E−01 | 1.3553E−01 | −4.9109E−01 | 1.2380E+00 | −2.0063E+00 | 2.0267E+00 | −1.2596E+00 | 4.3817E−01 | −6.4632E−02 |

TABLE 6

| Parameter | f(mm) | f1(mm) | f2(mm) | f3(mm) | TTL(mm) | ImgH(mm) |
|---|---|---|---|---|---|---|
| Numerical Value | 4.04 | 2.71 | −4.51 | −13.27 | 3.71 | 1.45 |

Figure 4A:
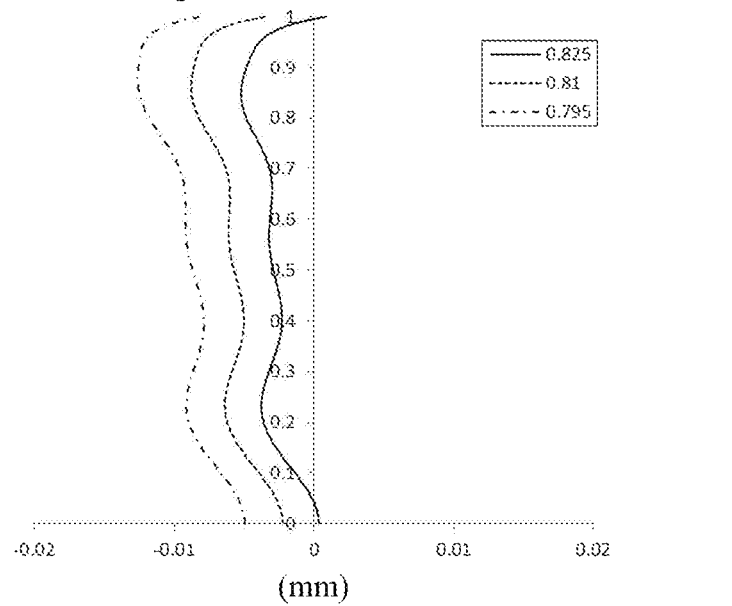
FIGS. 4A-4E respectively illustrate a longitudinal aberration curve, an astigmatic curve, a distortion curve, a lateral color curve and a relative illumination curve of the iris lens assembly according to Embodiment 2.
Figure 4B:
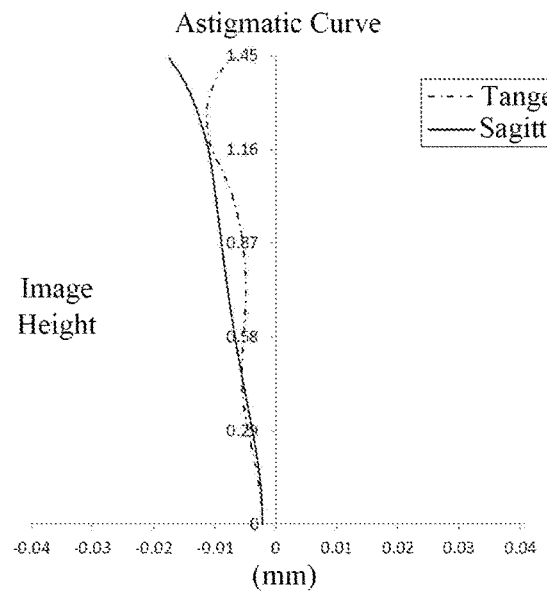
Figure 4C:
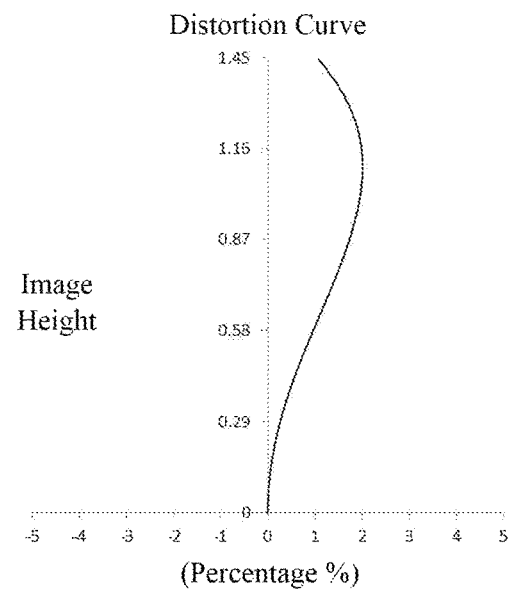
Figure 4D:
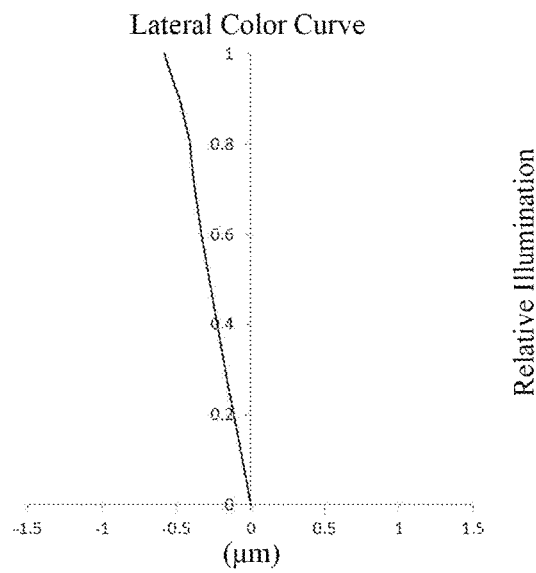
Figure 4E:
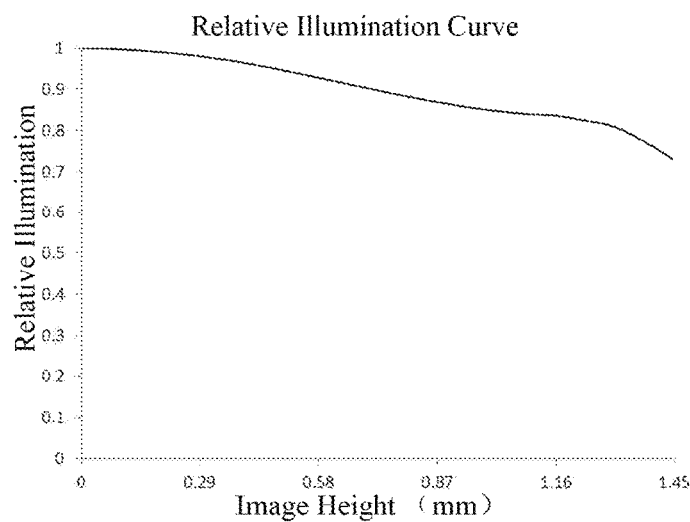

FIG. 4A illustrates a longitudinal aberration curve of the iris lens assembly according to Embodiment 2, representing deviations of focal points of light of different wavelengths converged after passing through the iris lens assembly. FIG. 4B illustrates an astigmatism curve of the iris lens assembly according to Embodiment 2, representing a curvature of a tangential image plane and a curvature of a sagittal image plane. FIG. 4C illustrates a distortion curve of the iris lens assembly according to Embodiment 2, representing amounts of distortion at different viewing angles. FIG. 4D illustrates a lateral color curve of the iris lens assembly according to Embodiment 2, representing deviations of different image heights on an image plane after light passes through the iris lens assembly. FIG. 4E illustrates a relative illumination curve of the iris lens assembly according to Embodiment 2, representing relative illumination corresponding to the different image heights on the image plane. It can be known that according to FIGS. 4A-4E the iris lens assembly provided in Embodiment 2 can achieve a good image quality.

Embodiment 3

Figure 5:
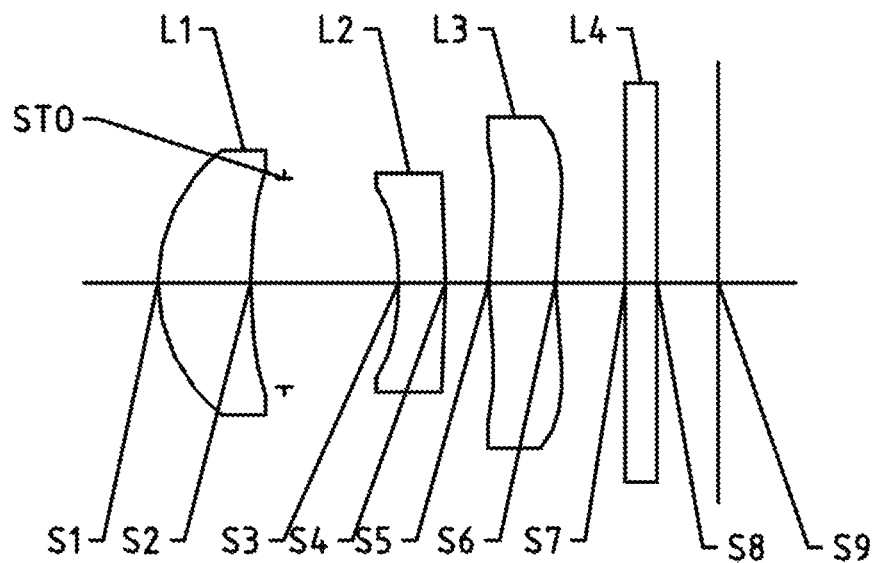
FIG. 5 illustrates a schematic structural diagram of an iris lens assembly according to Embodiment 3 of the present disclosure.

An iris lens assembly according to Embodiment 3 of the present disclosure is described below with reference to FIGS. 5-6E. FIG. 5 illustrates a schematic structural diagram of the iris lens assembly according to Embodiment 3 of the present disclosure.

As shown in FIG. 5, the iris lens assembly includes, along an optical axis, three lenses L1-L3 arranged in sequence from an object side to an image plane. A first lens L1 has an object side surface S1 and an image side surface S2, a second lens L2 has an object side surface S3 and an image side surface S4, and a third lens L3 has an object side surface S5 and an image side surface S6. Alternatively, the iris lens assembly may further include a filter L4 having an object side surface S7 and an image side surface S8. The filter L4 is an infrared (IR) filter. A bandpass wave band of the filter may range from about 750 nm to about 900 nm, and the bandpass wave band of the filter may further range from about 790 nm to about 830 nm. In the iris lens assembly of this embodiment, an aperture diaphragm STO for limiting light beams may also be arranged between the first lens L1 and the second lens L2, to improve the image quality. Light from an object sequentially passes through the surfaces S1 to S8 and finally forms an image on the image plane S9.

Table 7 shows the surface type, the radius of curvature, the thickness, the material and the conic coefficient of each lens of the iris lens assembly in Embodiment 3. The radius of curvature and the thickness are shown in millimeters (mm). Table 8 shows high-order coefficients $A_4, A_6, A_8, A_{10}, A_{12}, A_{14}, A_{16}, A_{18}$ and $A_{20}$ that can be applied to aspheric mirror surfaces S1-S6 in Embodiment 3. Table 9 shows the total effective focal length f of the iris lens assembly of Embodiment 3, the effective focal lengths f1-f3 of the lenses, the distance TTL from the object side surface S1 of the first lens L1 to the image plane S9 on the optical axis, and the half of a diagonal length of an effective pixel area ImgH on the image plane S9. A surface type of each aspheric surface may be defined by the formula (1) provided in Embodiment 1.

TABLE 7

| Surface Number | Surface Type | Radius of Curvature | Thickness | Material Refractive Index | Abbe Number | Conic Coefficient |
|---|---|---|---|---|---|---|
| OBJ | spherical | infinite | 262.0320 | | | |
| S1 | aspheric | 1.1077 | 0.6134 | 1.53 | 55.8 | −0.1405 |
| S2 | aspheric | 3.5048 | 0.2231 | | | 9.5003 |
| STO | spherical | infinite | 0.7566 | | | |
| S3 | aspheric | −2.0458 | 0.3086 | 1.53 | 55.8 | −21.2482 |
| S4 | aspheric | −101.2477 | 0.2851 | | | 50.0000 |
| S5 | aspheric | 2.1171 | 0.4418 | 1.53 | 55.8 | −20.1751 |
| S6 | aspheric | 2.2667 | 0.4614 | | | −1.4111 |
| S7 | spherical | infinite | 0.2100 | 1.52 | 64.2 | |
| S8 | spherical | infinite | 0.4049 | | | |
| S9 | spherical | infinite | | | | |

TABLE 8

| Surface Number | A4 | A6 | A8 | A10 | A12 |
|---|---|---|---|---|---|
| S1 | 9.1772E−03 | −3.0345E−02 | 2.6888E−01 | −9.1084E−01 | 1.8161E+00 |
| S2 | 1.0109E−02 | 2.6710E−03 | −1.1187E−02 | 1.8479E−01 | −3.0615E−01 |
| S3 | −6.4539E−01 | 1.1489E+00 | −2.4489E+00 | −6.7981E+00 | 8.9782E+01 |
| S4 | −4.1917E−01 | 1.4821E+00 | −5.0062E+00 | 2.0105E+01 | −6.3388E+01 |
| S5 | −2.7885E−01 | 9.0199E−03 | 4.4929E−01 | −4.9553E−01 | −1.6486E−01 |
| S6 | −3.1565E−01 | 2.3633E−02 | 2.6663E−01 | −4.5305E−01 | 3.4154E−01 |

| Surface Number | A14 | A16 | A18 | A20 |
|---|---|---|---|---|
| S1 | −1.8517E+00 | 7.9876E−01 | 0.0000E+00 | 0.0000E+00 |
| S2 | 9.1712E−02 | 2.7161E−01 | 0.0000E+00 | 0.0000E+00 |
| S3 | −4.2743E+02 | 1.0879E+03 | −1.4540E+03 | 7.9231E+02 |
| S4 | 1.3503E+02 | −1.8125E+02 | 1.3846E+02 | −4.5778E+01 |
| S5 | 6.5319E−01 | −4.7177E−01 | 1.4495E−01 | −1.6733E−02 |
| S6 | −1.3501E−01 | 2.1058E−02 | 0.0000E+00 | 0.0000E+00 |

TABLE 9

| Parameter | f (mm) | f1 (mm) | f2 (mm) | f3 (mm) | TTL (mm) | ImgH (mm) |
|---|---|---|---|---|---|---|
| Numerical Value | 3.76 | 2.82 | −3.96 | 30.15 | 3.70 | 1.45 |

Figure 6A:
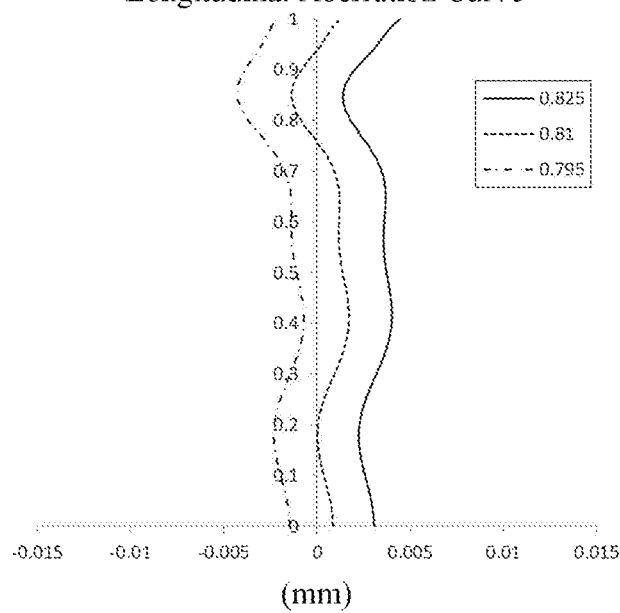

FIG. 6A illustrates a longitudinal aberration curve of the iris lens assembly according to Embodiment 3, representing deviations of focal points of light of different wavelengths converged after passing through the iris lens assembly. FIG. 6B illustrates an astigmatism curve of the iris lens assembly according to Embodiment 3, representing a curvature of a tangential image plane and a curvature of a sagittal image plane. FIG. 6C illustrates a distortion curve of the iris lens assembly according to Embodiment 3, representing amounts of distortion at different viewing angles. FIG. 6D illustrates a lateral color curve of the iris lens assembly according to Embodiment 3, representing deviations of different image heights on an image plane after light passes through the iris lens assembly. FIG. 6E illustrates a relative illumination curve of the iris lens assembly according to Embodiment 3, representing relative illumination corresponding to the different image heights on the image plane. It can be known that according to FIGS. 6A-6E the iris lens assembly provided in Embodiment 3 can achieve a good image quality.

Embodiment 4

Figure 7:
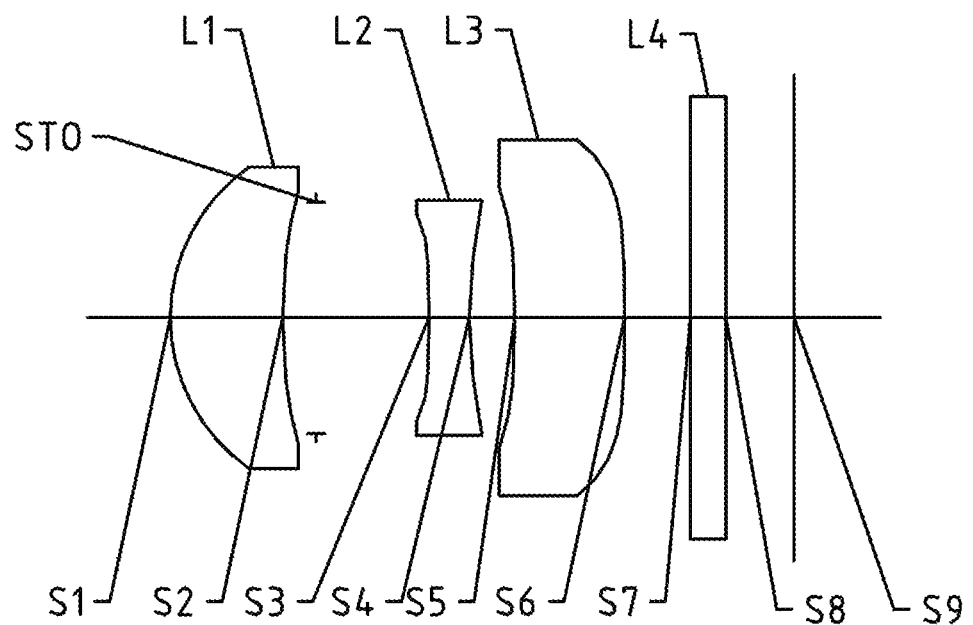
FIG. 7 illustrates a schematic structural diagram of an iris lens assembly according to Embodiment 7 of the present disclosure.

An iris lens assembly according to Embodiment 4 of the present disclosure is described below with reference to FIGS. 7-8E. FIG. 7 illustrates a schematic structural diagram of the iris lens assembly according to Embodiment 4 of the present disclosure.

As shown in FIG. 7, the iris lens assembly includes, along an optical axis, three lenses L1-L3 arranged in sequence from an object side to an image plane. A first lens L1 has an object side surface S1 and an image side surface S2, a second lens L2 has an object side surface S3 and an image side surface S4, and a third lens L3 has an object side surface S5 and an image side surface S6. Alternatively, the iris lens assembly may further include a filter L4 having an object side surface S7 and an image side surface S8. The filter L4 is an infrared (IR) filter. A bandpass wave band of the filter may range from about 750 nm to about 900 nm, and the bandpass wave band of the filter may further range from about 790 nm to about 830 nm. In the iris lens assembly of this embodiment, an aperture diaphragm STO for limiting light beams may also be arranged between the first lens L1 and the second lens L2, to improve the image quality. Light from an object sequentially passes through the surfaces S1 to S8 and finally forms an image on the image plane S9.

Table 10 shows the surface type, the radius of curvature, the thickness, the material and the conic coefficient of each lens of the iris lens assembly in Embodiment 4. The radius of curvature and the thickness are shown in millimeters (mm). Table 11 shows high-order coefficients $A_4$, $A_6$, $A_8$, $A_{10}$, $A_{12}$, $A_{14}$, $A_{16}$, $A_{18}$ and $A_{20}$ that can be applied to aspheric mirror surfaces S1-S6 in Embodiment 4. Table 12 shows the total effective focal length f of the iris lens assembly of Embodiment 4, the effective focal lengths f1-f3 of the lenses, the distance TTL from the object side surface S1 of the first lens L1 to the image plane S9 on the optical axis, and the half of a diagonal length of an effective pixel area ImgH on the image plane S9. A surface type of each aspheric surface may be defined by the formula (1) provided in Embodiment 1.

TABLE 10

| Surface Number | Surface Type | Radius of Curvature | Thickness | Material Refractive Index | Abbe Number | Conic Coefficient |
|---|---|---|---|---|---|---|
| OBJ | spherical | infinite | 262.0320 | | | |
| S1 | aspheric | 1.0818 | 0.6679 | 1.53 | 55.8 | −0.1683 |
| S2 | aspheric | 3.6459 | 0.1985 | | | 8.9642 |
| STO | spherical | infinite | 0.6705 | | | |
| S3 | aspheric | −35.2831 | 0.2400 | 1.62 | 23.5 | 50.0000 |
| S4 | aspheric | 2.6188 | 0.2695 | | | −56.2045 |
| S5 | aspheric | −13.8962 | 0.6514 | 1.53 | 55.8 | −75.7075 |
| S6 | aspheric | −142.7396 | 0.3922 | | | 50.0000 |
| S7 | spherical | infinite | 0.2100 | 1.52 | 64.2 | |
| S8 | spherical | infinite | 0.4047 | | | |
| S9 | spherical | infinite | | | | |

TABLE 11

| Surface Number | A4 | A6 | A8 | A10 | A12 | A14 | A16 | A18 | A20 |
|---|---|---|---|---|---|---|---|---|---|
| S1 | 8.4435E−03 | −5.2456E−02 | 3.3497E−01 | −1.0190E+00 | 1.8014E+00 | −1.6593E+00 | 6.4564E−01 | 0.0000E+00 | 0.0000E+00 |
| S2 | 5.0858E−03 | 7.3196E−03 | −3.0778E−02 | 1.7496E−01 | −2.6543E−01 | 1.0578E−01 | 1.4936E−01 | 0.0000E+00 | 0.0000E+00 |
| S3 | −3.8303E−01 | 4.1931E−01 | −5.6621E+00 | 4.5984E+01 | −2.6958E+02 | 9.9380E+02 | −2.2705E+03 | 2.9471E+03 | −1.6922E+03 |
| S4 | 1.5644E−01 | −9.1744E−01 | 3.7898E+00 | −7.2787E+00 | −2.2439E+00 | 4.6245E+01 | −1.0234E+02 | 9.9190E+01 | −3.7820E+01 |
| S5 | −2.4651E−01 | −8.7280E−02 | 8.6116E−01 | −2.0443E+00 | 2.9021E+00 | −2.3897E+00 | 1.1115E+00 | −2.7151E−01 | 2.7099E−02 |
| S6 | −1.5223E−01 | −1.3642E−01 | 1.7098E−01 | 3.8107E−01 | −1.7393E+00 | 2.6578E+00 | −2.0614E+00 | 7.9602E−01 | −1.2116E−01 |

TABLE 12

| Parameter | f (mm) | f1 (mm) | f2 (mm) | f3 (mm) | TTL (mm) | ImgH (mm) |
|---|---|---|---|---|---|---|
| Numerical Value | 3.88 | 2.67 | −3.91 | −29.19 | 3.70 | 1.45 |

Figure 8A:
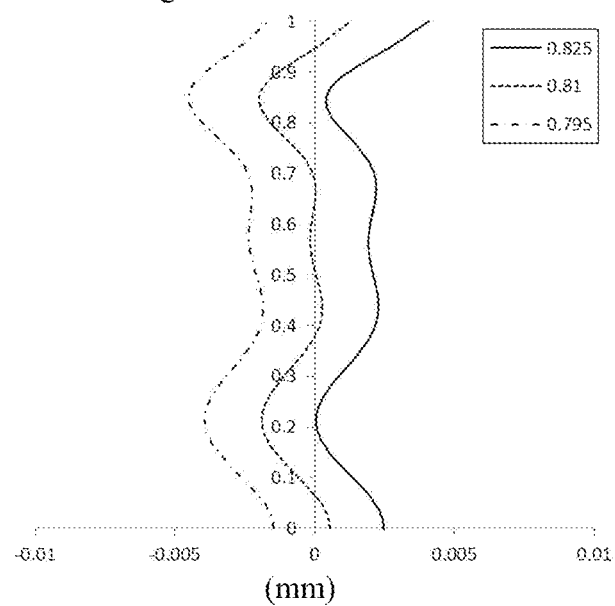

FIG. 8A illustrates a longitudinal aberration curve of the iris lens assembly according to Embodiment 4, representing deviations of focal points of light of different wavelengths converged after passing through the iris lens assembly. FIG. 8B illustrates an astigmatism curve of the iris lens assembly according to Embodiment 4, representing a curvature of a tangential image plane and a curvature of a sagittal image plane. FIG. 8C illustrates a distortion curve of the iris lens assembly according to Embodiment 4, representing amounts of distortion at different viewing angles. FIG. 8D illustrates a lateral color curve of the iris lens assembly according to Embodiment 4, representing deviations of different image heights on an image plane after light passes through the iris lens assembly. FIG. 8E illustrates a relative illumination curve of the iris lens assembly according to Embodiment 4, representing relative illumination corresponding to the different image heights on the image plane. It can be known that according to FIGS. 8A-8E the iris lens assembly provided in Embodiment 4 can achieve a good image quality.

Embodiment 5

Figure 9:
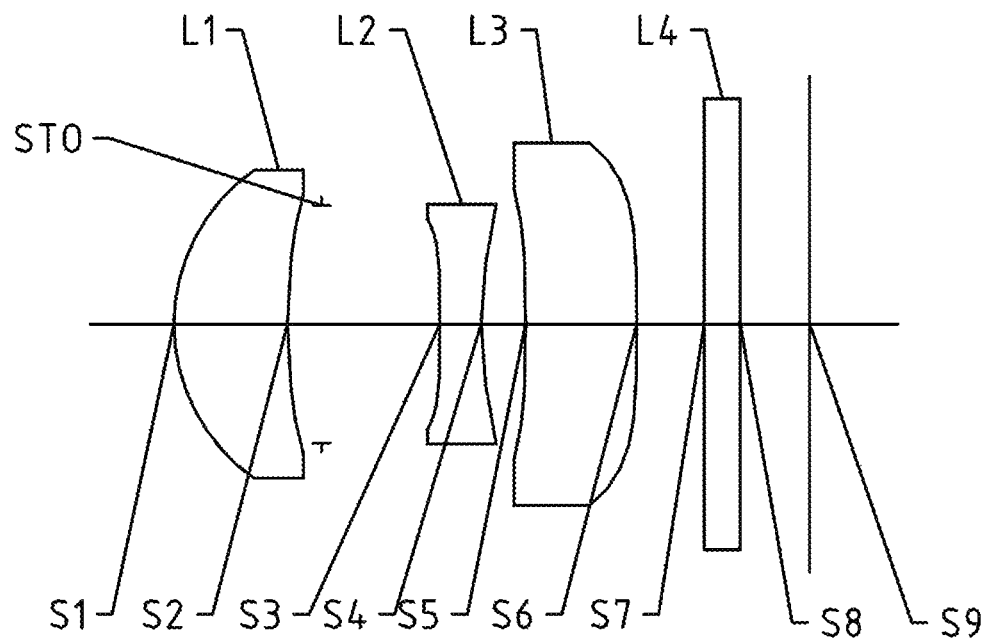
FIG. 9 illustrates a schematic structural diagram of an iris lens assembly according to Embodiment 5 of the present disclosure.

An iris lens assembly according to Embodiment 5 of the present disclosure is described below with reference to FIGS. 9-10E. FIG. 9 illustrates a schematic structural diagram of the iris lens assembly according to Embodiment 5 of the present disclosure.

As shown in FIG. 9, the iris lens assembly includes, along an optical axis, three lenses L1-L3 arranged in sequence from an object side to an image plane. A first lens L1 has an object side surface S1 and an image side surface S2, a second lens L2 has an object side surface S3 and an image side surface S4, and a third lens L3 has an object side surface S5 and an image side surface S6. Alternatively, the iris lens assembly may further include a filter L4 having an object side surface S7 and an image side surface S8. The filter L4 is an infrared (IR) filter. A bandpass wave band of the filter may range from about 750 nm to about 900 nm, and the bandpass wave band of the filter may further range from about 790 nm to about 830 nm. In the iris lens assembly of this embodiment, an aperture diaphragm STO for limiting light beams may also be arranged between the first lens L1 and the second lens L2, to improve the image quality. Light from an object sequentially passes through the surfaces S1 to S8 and finally forms an image on the image plane S9.

Table 13 shows the surface type, the radius of curvature, the thickness, the material and the conic coefficient of each lens of the iris lens assembly in Embodiment 5. The radius of curvature and the thickness are shown in millimeters (mm). Table 14 shows high-order coefficients $A_4$, $A_6$, $A_8$, $A_{10}$, $A_{12}$, $A_{14}$, $A_{16}$, $A_{18}$ and $A_{20}$ that can be applied to aspheric mirror surfaces S1-S6 in Embodiment 5. Table 15 shows the total effective focal length f of the iris lens assembly of Embodiment 5, the effective focal lengths f1-f3 of the lenses, the distance TTL from the object side surface S1 of the first lens L1 to the image plane S9 on the optical axis, and the half of a diagonal length of an effective pixel area ImgH on the image plane S9. A surface type of each aspheric surface may be defined by the formula (1) provided in Embodiment 1.

TABLE 13

| Surface Number | Surface Type | Radius of Curvature | Thickness | Material Refractive Index | Abbe Number | Conic Coefficient |
|---|---|---|---|---|---|---|
| OBJ | spherical | infinite | 262.0320 | | | |
| S1 | aspheric | 1.0834 | 0.6619 | 1.53 | 55.8 | −0.1703 |
| S2 | aspheric | 3.6538 | 0.1983 | | | 8.8208 |
| STO | spherical | infinite | 0.6893 | | | |
| S3 | aspheric | 49.3684 | 0.2400 | 1.62 | 23.5 | −99.0000 |
| S4 | aspheric | 2.0658 | 0.2591 | | | −43.5375 |
| S5 | aspheric | −105.1236 | 0.6474 | 1.53 | 55.8 | −99.0000 |
| S6 | aspheric | −142.6087 | 0.3940 | | | 50.0000 |
| S7 | spherical | infinite | 0.2100 | 1.52 | 64.2 | |
| S8 | spherical | infinite | 0.4046 | | | |
| S9 | spherical | infinite | | | | |

TABLE 14

| Surface Number | A4 | A6 | A8 | A10 | A12 | A14 | A16 | A18 | A20 |
|---|---|---|---|---|---|---|---|---|---|
| S1 | 8.2233E−03 | −5.1989E−02 | 3.2960E−01 | −1.0032E+00 | 1.7751E+00 | −1.6368E+00 | 6.3714E−01 | 0.0000E+00 | 0.0000E+00 |
| S2 | 4.2735E−03 | 4.6890E−03 | −2.7218E−02 | 1.7746E−01 | −2.7115E−01 | 9.4352E−02 | 1.6085E−01 | 0.0000E+00 | 0.0000E+00 |
| S3 | −4.4623E−01 | 3.0579E−01 | −3.6252E+00 | 2.8262E+01 | −1.7574E+02 | 6.7145E+02 | −1.5694E+03 | 2.0724E+03 | −1.2183E+03 |
| S4 | 3.0923E−01 | −2.1969E+00 | 1.1493E+01 | −4.1975E+01 | 1.0641E+02 | −1.7956E+02 | 1.9185E+02 | −1.1635E+02 | 2.9367E+01 |
| S5 | −2.1941E−01 | −1.2628E−01 | 1.1549E+00 | −2.9227E+00 | 4.3360E+00 | −3.7063E+00 | 1.7872E+00 | −4.5253E−01 | 4.6830E−02 |
| S6 | −1.4559E−01 | −1.6193E−01 | 2.6587E−01 | 1.1508E−01 | −1.2374E+00 | 2.0489E+00 | −1.6141E+00 | 6.1771E−01 | −9.2069E−02 |

TABLE 15

| Parameter | f (mm) | f1 (mm) | f2 (mm) | f3 (mm) | TTL (mm) | ImgH (mm) |
|---|---|---|---|---|---|---|
| Numerical Value | 3.88 | 2.68 | −3.47 | −761.57 | 3.70 | 1.45 |

Figure 10A:
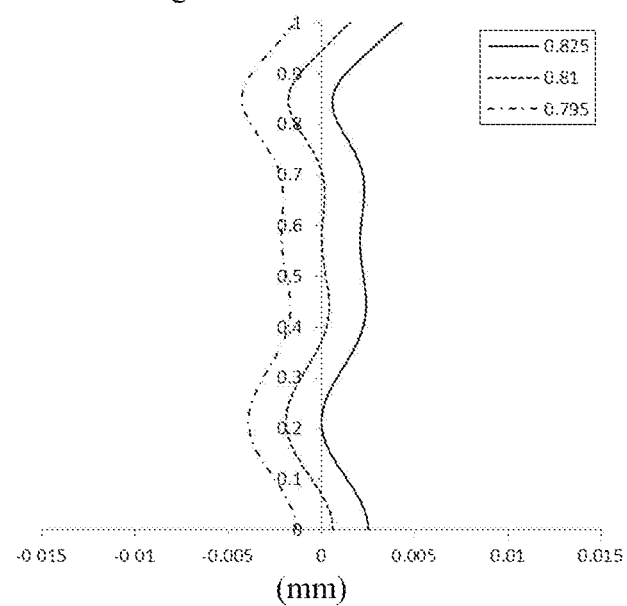

FIG. 10A illustrates a longitudinal aberration curve of the iris lens assembly according to Embodiment 5, representing deviations of focal points of light of different wavelengths converged after passing through the iris lens assembly. FIG. 10B illustrates an astigmatism curve of the iris lens assembly according to Embodiment 5, representing a curvature of a tangential image plane and a curvature of a sagittal image plane. FIG. 10C illustrates a distortion curve of the iris lens assembly according to Embodiment 5, representing amounts of distortion at different viewing angles. FIG. 10D illustrates a lateral color curve of the iris lens assembly according to Embodiment 5, representing deviations of different image heights on an image plane after light passes through the iris lens assembly. FIG. 10E illustrates a relative illumination curve of the iris lens assembly according to Embodiment 5, representing relative illumination corresponding to the different image heights on the image plane. It can be known that according to FIGS. 10A-10E the iris lens assembly provided in Embodiment 5 can achieve a good image quality.

Embodiment 6

Figure 11:
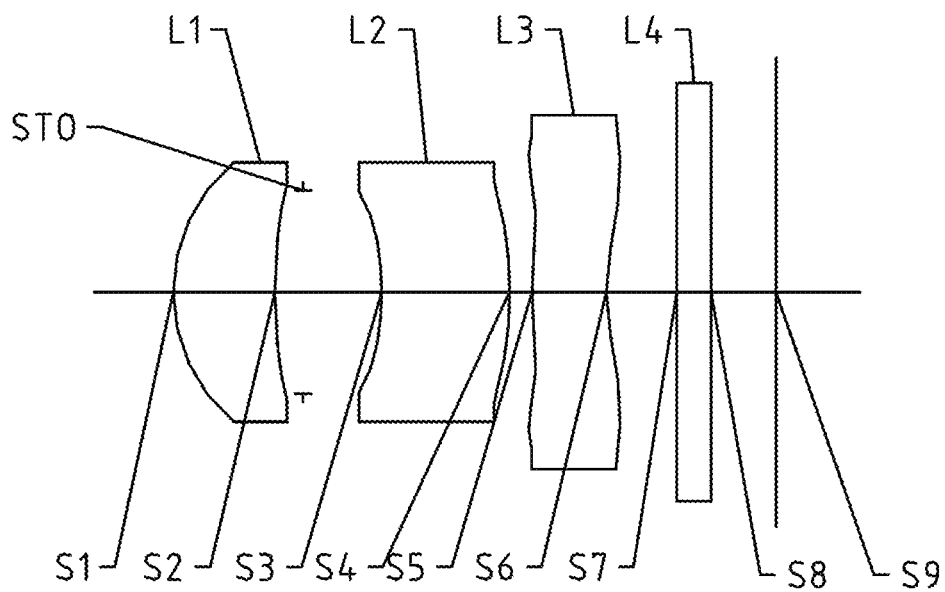
FIG. 11 illustrates a schematic structural diagram of an iris lens assembly according to Embodiment 6 of the present disclosure.

An iris lens assembly according to Embodiment 6 of the present disclosure is described below with reference to FIGS. 11-12E. FIG. 11 illustrates a schematic structural diagram of the iris lens assembly according to Embodiment 6 of the present disclosure.

As shown in FIG. 11, the iris lens assembly includes, along an optical axis, three lenses L1-L3 arranged in sequence from an object side to an image plane. A first lens L1 has an object side surface S1 and an image side surface S2, a second lens L2 has an object side surface S3 and an image side surface S4, and a third lens L3 has an object side surface S5 and an image side surface S6. Alternatively, the iris lens assembly may further include a filter L4 having an object side surface S7 and an image side surface S8. The filter L4 is an infrared (IR) filter. A bandpass wave band of the filter may range from about 750 nm to about 900 nm, and the bandpass wave band of the filter may further range from about 790 nm to about 830 nm. In the iris lens assembly of this embodiment, an aperture diaphragm STO for limiting light beams may also be arranged between the first lens L1 and the second lens L2, to improve the image quality. Light from an object sequentially passes through the surfaces S1 to S8 and finally forms an image on the image plane S9.

Table 16 shows the surface type, the radius of curvature, the thickness, the material and the conic coefficient of each lens of the iris lens assembly in Embodiment 6. The radius of curvature and the thickness are shown in millimeters (mm). Table 17 shows high-order coefficients $A_4$, $A_6$, $A_8$, $A_{10}$, $A_{12}$, $A_{14}$, $A_{16}$, $A_{18}$ and $A_{20}$ that can be applied to aspheric mirror surfaces S1-S6 in Embodiment 6. Table 18 shows the total effective focal length f of the iris lens assembly of Embodiment 6, the effective focal lengths f1-f3 of the lenses, the distance TTL from the object side surface S1 of the first lens L1 to the image plane S9 on the optical axis, and the half of a diagonal length of an effective pixel area ImgH on the image plane S9. A surface type of each aspheric surface may be defined by the formula (1) provided in Embodiment 1.

TABLE 16

| Surface Number | Surface Type | Radius of Curvature | Thickness | Refractive Index | Abbe Number | Conic Coefficient |
|---|---|---|---|---|---|---|
| OBJ | spherical | infinite | 260.0000 | | | |
| S1 | aspheric | 1.0631 | 0.6234 | 1.53 | 55.8 | −0.0984 |
| S2 | aspheric | 3.6859 | 0.1733 | | | 11.0764 |
| STO | spherical | infinite | 0.4822 | | | |
| S3 | aspheric | −1.8791 | 0.7838 | 1.53 | 55.8 | −27.0408 |
| S4 | aspheric | −5.6563 | 0.1390 | | | 36.8091 |
| S5 | aspheric | 1.4875 | 0.4562 | 1.53 | 55.8 | −24.3305 |
| S6 | aspheric | 1.2251 | 0.4320 | | | 0.0911 |
| S7 | spherical | infinite | 0.2100 | 1.52 | 64.2 | |
| S8 | spherical | infinite | 0.3998 | | | |
| S9 | spherical | infinite | | | | |

TABLE 17

| Surface Number | A4 | A6 | A8 | A10 | A12 |
|---|---|---|---|---|---|
| S1 | 1.3109E−02 | −1.2915E−02 | 2.0529E−01 | −6.8727E−01 | 1.5415E+00 |
| S2 | 1.8202E−02 | 5.3323E−03 | 1.9541E−02 | 1.6925E−01 | −4.5370E−01 |
| S3 | −7.0358E−01 | 2.3855E+00 | −1.7490E+01 | 1.1878E+02 | −6.0235E+02 |
| S4 | −1.0857E+00 | 5.0657E+00 | −1.9700E+01 | 6.8288E+01 | −1.7662E+02 |
| S5 | −7.9722E−01 | 5.5023E−01 | 2.3274E+00 | −7.7945E+00 | 1.2454E+01 |
| S6 | −8.8016E−01 | 9.9614E−01 | −1.0621E+00 | 7.9678E−01 | −4.7625E−01 |

| Surface Number | A14 | A16 | A18 | A20 |
|---|---|---|---|---|
| S1 | −1.7705E+00 | 8.9784E−01 | 0.0000E+00 | 0.0000E+00 |
| S2 | 2.2633E−01 | 4.3174E−01 | 0.0000E+00 | 0.0000E+00 |
| S3 | 2.0480E+03 | −4.4063E+03 | 5.4033E+03 | −2.8899E+03 |
| S4 | 3.1672E+02 | −3.6512E+02 | 2.4229E+02 | −7.0234E+01 |
| S5 | −1.1264E+01 | 5.7616E+00 | −1.5500E+00 | 1.7022E−01 |
| S6 | 2.1033E−01 | −5.3364E−02 | 0.0000E+00 | 0.0000E+00 |

TABLE 18

| Parameter | f (mm) | f1 (mm) | f2 (mm) | f3 (mm) | TTL (mm) | ImgH (mm) |
|---|---|---|---|---|---|---|
| Numerical Value | 3.43 | 2.61 | −5.74 | −32.94 | 3.70 | 1.45 |

Figure 12A:
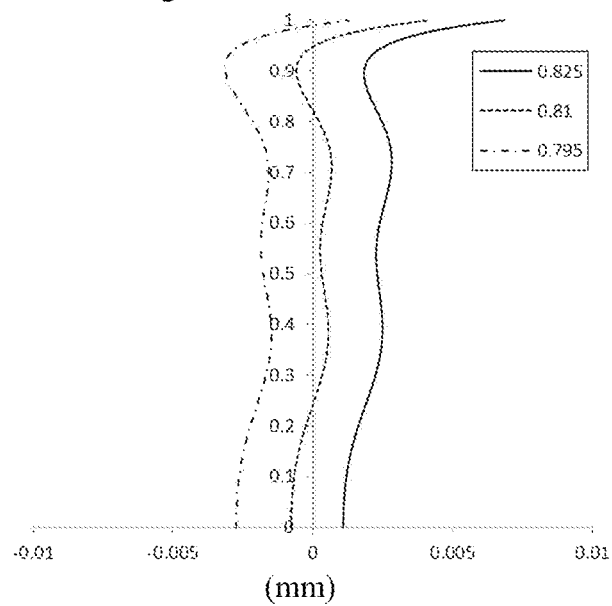

FIG. 12A illustrates a longitudinal aberration curve of the iris lens assembly according to Embodiment 6, representing deviations of focal points of light of different wavelengths converged after passing through the iris lens assembly. FIG. 12B illustrates an astigmatism curve of the iris lens assembly according to Embodiment 6, representing a curvature of a tangential image plane and a curvature of a sagittal image plane. FIG. 12C illustrates a distortion curve of the iris lens assembly according to Embodiment 6, representing amounts of distortion at different viewing angles. FIG. 12D illustrates a lateral color curve of the iris lens assembly according to Embodiment 6, representing deviations of different image heights on an image plane after light passes through the iris lens assembly. FIG. 12E illustrates a relative illumination curve of the iris lens assembly according to Embodiment 6, representing relative illumination corresponding to the different image heights on the image plane. It can be known that according to FIGS. 12A-12E the iris lens assembly provided in Embodiment 6 can achieve a good image quality.

Embodiment 7

Figure 13:
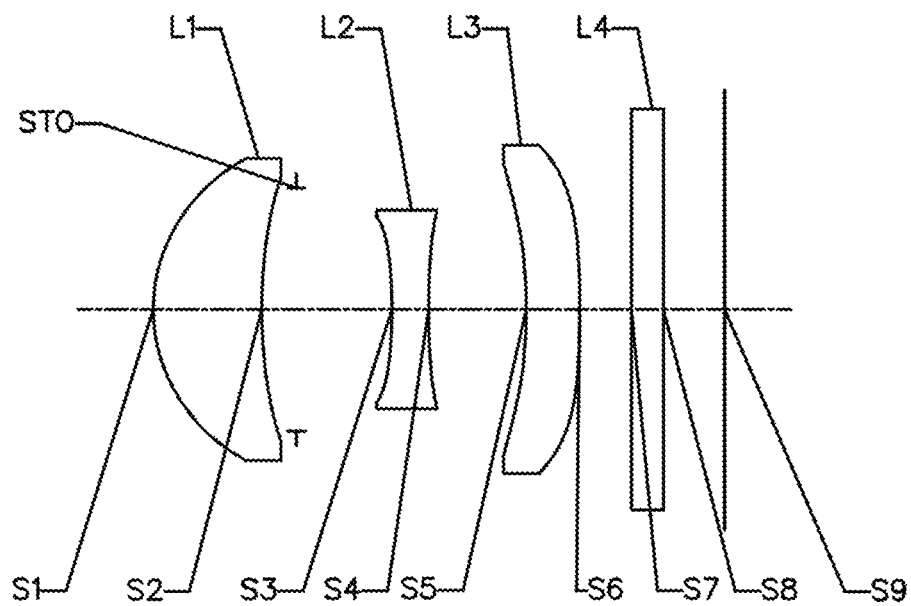
FIG. 13 illustrates a schematic structural diagram of an iris lens assembly according to Embodiment 7 of the present disclosure.

An iris lens assembly according to Embodiment 7 of the present disclosure is described below with reference to FIGS. 13-14E. FIG. 13 illustrates a schematic structural diagram of the iris lens assembly according to Embodiment 7 of the present disclosure.

As shown in FIG. 13, the iris lens assembly includes, along an optical axis, three lenses L1-L3 arranged in sequence from an object side to an image plane. A first lens L1 has an object side surface S1 and an image side surface S2, a second lens L2 has an object side surface S3 and an image side surface S4, and a third lens L3 has an object side surface S5 and an image side surface S6. Alternatively, the iris lens assembly may further include a filter L4 having an object side surface S7 and an image side surface S8. The filter L4 is an infrared (IR) filter. A bandpass wave band of the filter may range from about 750 nm to about 900 nm, and the bandpass wave band of the filter may further range from about 790 nm to about 830 nm. In the iris lens assembly of this embodiment, an aperture diaphragm STO for limiting light beams may also be arranged between the first lens L1 and the second lens L2, to improve the image quality. Light from an object sequentially passes through the surfaces S1 to S8 and finally forms an image on the image plane S9.

Table 19 shows the surface type, the radius of curvature, the thickness, the material and the conic coefficient of each lens of the iris lens assembly in Embodiment 7. The radius of curvature and the thickness are shown in millimeters (mm). Table 20 shows high-order coefficients $A_4$, $A_6$, $A_8$, $A_{10}$, $A_{12}$, $A_{14}$, $A_{16}$, $A_{18}$ and $A_{20}$ that can be applied to aspheric mirror surfaces S1-S6 in Embodiment 7. Table 21 shows the total effective focal length f of the iris lens assembly of Embodiment 7, the effective focal lengths f1-f3 of the lenses, the distance TTL from the object side surface S1 of the first lens L1 to the image plane S9 on the optical axis, and the half of a diagonal length of an effective pixel area ImgH on the image plane S9. A surface type of each aspheric surface may be defined by the formula (1) provided in Embodiment 1.

TABLE 19

| Surface Number | Surface Type | Radius of Curvature | Thickness | Material Refractive Index | Material Abbe Number | Conic Coefficient |
|---|---|---|---|---|---|---|
| OBJ | spherical | infinite | 260.0000 | | | |
| S1 | aspheric | 1.0763 | 0.7086 | 1.528 | 55.78 | −0.1912 |
| S2 | aspheric | 3.5270 | 0.2267 | | | 8.0385 |
| STO | spherical | infinite | 0.6224 | | | |
| S3 | aspheric | −3.6803 | 0.2400 | 1.622 | 23.53 | −65.162 |
| S4 | aspheric | 6.7417 | 0.6360 | | | −8.910 |
| S5 | aspheric | −3.7348 | 0.3489 | 1.528 | 55.78 | −99.0000 |
| S6 | aspheric | −12.3958 | 0.3373 | | | −99.0000 |
| S7 | spherical | infinite | 0.2100 | 1.517 | 64.17 | |
| S8 | spherical | infinite | 0.4057 | | | |
| S9 | spherical | infinite | | | | |

TABLE 20

| Surface Number | A4 | A6 | A8 | A10 | A12 | A14 | A16 | A18 | A20 |
|---|---|---|---|---|---|---|---|---|---|
| S1 | 1.0754E−02 | −5.3431E−02 | 2.6513E−01 | −6.4481E−01 | 9.0158E−01 | −6.5310E−01 | 1.9753E−01 | 0.0000E+00 | 0.0000E+00 |
| S2 | 3.6844E−03 | −2.8255E−02 | −5.6475E−02 | 1.7004E−01 | −2.3734E−01 | −8.3061E−03 | 0.0000E+00 | 0.0000E+00 | 0.0000E+00 |
| S3 | −2.2816E−01 | −2.3240E+00 | 3.6583E+01 | −3.5951E+02 | 2.1563E+03 | −8.1042E+03 | 1.8472E+04 | −2.3307E+04 | 1.2441E+04 |
| S4 | 1.0828E−01 | 8.2726E−01 | −1.1992E+01 | 9.8413E+01 | −4.9526E+02 | 1.5589E+03 | −2.9990E+03 | 3.2285E+03 | −1.4914E+03 |
| S5 | −3.6045E−01 | 9.4189E−01 | −2.3712E+00 | 4.6287E+00 | −6.0500E+00 | 5.0582E+00 | −2.5606E+00 | 7.0858E−01 | −8.1904E−02 |
| S6 | −2.4676E−01 | 5.6355E−01 | −2.0539E+00 | 4.9716E+00 | −7.9696E+00 | 8.2582E+00 | −5.3014E+00 | 1.9039E+00 | −2.9015E−01 |

TABLE 21

| Parameter | f (mm) | f1 (mm) | f2 (mm) | f3 (mm) | TTL (mm) | ImgH (mm) |
|---|---|---|---|---|---|---|
| Numerical Value | 4.27 | 2.67 | −3.79 | −10.26 | 3.74 | 1.45 |

Figure 14A:
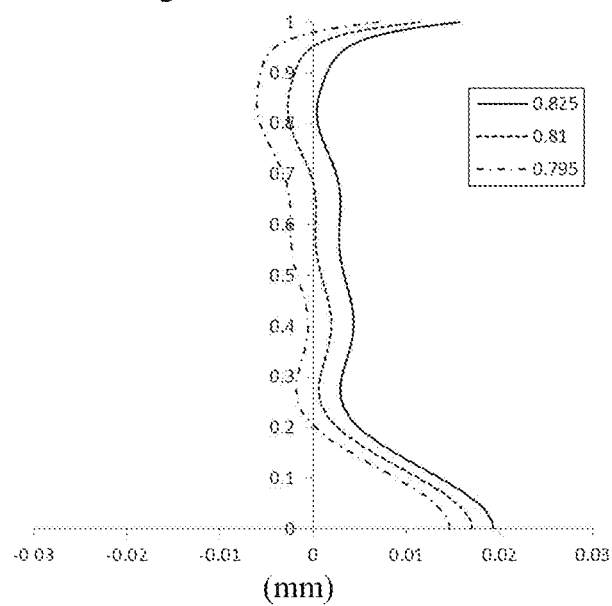
FIGS. 14A-14E respectively illustrate a longitudinal aberration curve, an astigmatic curve, a distortion curve, lateral color curve and a relative illumination curve of the iris lens assembly according to Embodiment 7.
Figure 14B:
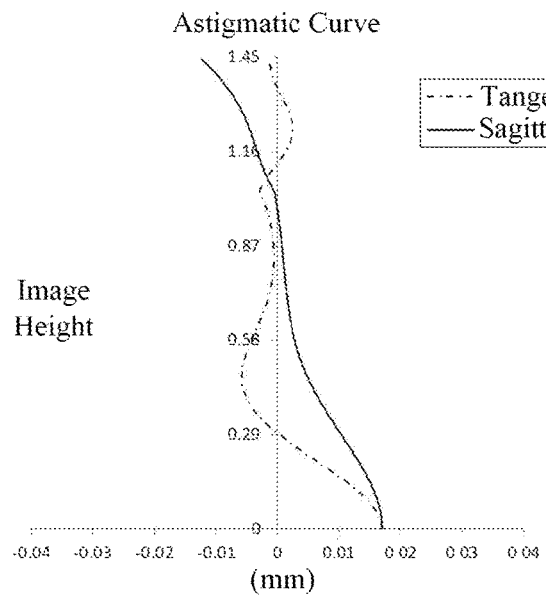
Figure 14C:
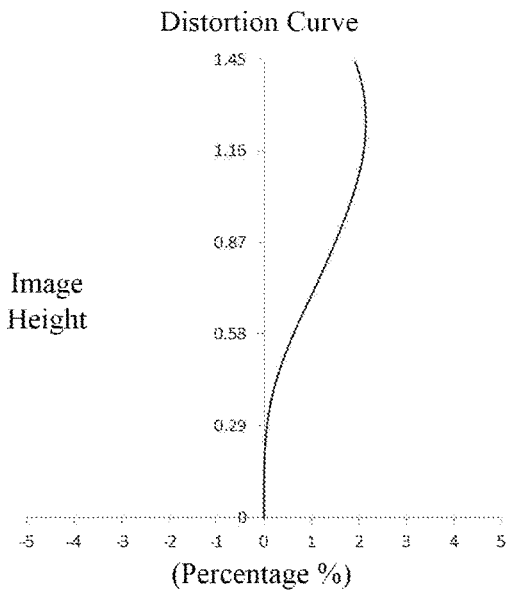
Figure 14D:
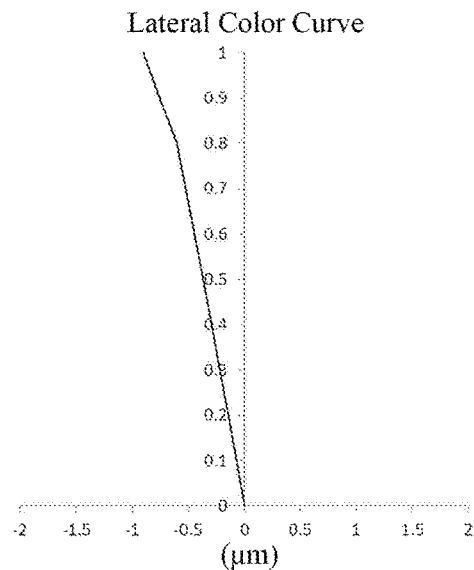
Figure 14E:
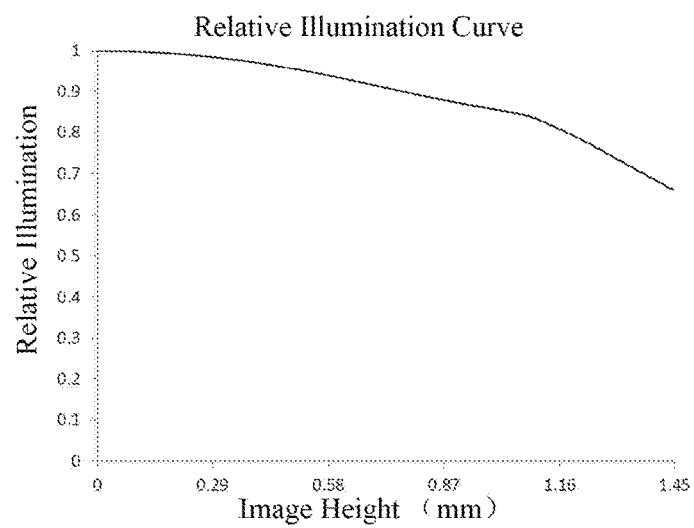

FIG. 14A illustrates a longitudinal aberration curve of the iris lens assembly according to Embodiment 7, representing deviations of focal points of light of different wavelengths converged after passing through the iris lens assembly. FIG. 14B illustrates an astigmatism curve of the iris lens assembly according to Embodiment 7, representing a curvature of a tangential image plane and a curvature of a sagittal image plane. FIG. 14C illustrates a distortion curve of the iris lens assembly according to Embodiment 7, representing amounts of distortion at different viewing angles. FIG. 14D illustrates a lateral color curve of the iris lens assembly according to Embodiment 7, representing deviations of different image heights on an image plane after light passes through the iris lens assembly. FIG. 14E illustrates a relative illumination curve of the iris lens assembly according to Embodiment 7, representing relative illumination corresponding to the different image heights on the image plane. It can be known that according to FIGS. 14A-14E the iris lens assembly provided in Embodiment 7 can achieve a good image quality.

To sum up, Embodiment 1 to Embodiment 7 respectively satisfy the relations shown in Table 22 below.

TABLE 22

| Conditional Formula | Embodiment | | | | | | |
|---|---|---|---|---|---|---|---|
| | 1 | 2 | 3 | 4 | 5 | 6 | 7 |
| CT1/CT3 | 1.79 | 1.72 | 1.39 | 1.04 | 1.02 | 1.37 | 2.03 |
| CT1/TTL | 0.18 | 0.18 | 0.17 | 0.18 | 0.18 | 0.17 | 0.19 |
| (R1 + R2)/(R1 − R2) | −1.96 | −1.94 | −1.92 | −1.84 | −1.84 | −1.83 | −1.88 |
| TTL/ImgH | 2.56 | 2.56 | 2.56 | 2.56 | 2.56 | 2.56 | 2.59 |
| |f2/f3| | 0.18 | 0.34 | 0.13 | 0.13 | 0.00 | 0.17 | 0.37 |
| TTL/f | 0.93 | 0.92 | 0.98 | 0.95 | 0.95 | 1.08 | 0.88 |
| DTS/DT21 | 1.14 | 1.18 | 1.09 | 1.12 | 1.13 | 1.01 | 1.30 |
| DT12/DT21 | 1.26 | 1.28 | 1.19 | 1.22 | 1.23 | 1.09 | 1.42 |

The present disclosure further provides a camera device, having a photosensitive element which may be a photosensitive charge-coupled device (CCD) or a complementary metal-oxide semiconductor (CMOS) element. The camera device may be an independent camera device such as a digital camera, or may be a camera module integrated in a mobile electronic device such as a mobile phone. The camera device is equipped with the iris lens assembly described above.

The foregoing descriptions are merely illustrations for the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, for example, technical solutions formed by replacing the above features as disclosed in the present disclosure with (but not limited to) technical features having similar functions.

What is claimed is:

1. An iris lens assembly, comprising sequentially a first lens, a second lens, and a third lens from an object side to an image plane along an optical axis, wherein the first lens has a positive refractive power, an object side surface of the first lens is a convex surface and an image side surface of the first lens is a concave surface;

the second lens has a negative refractive power;

the third lens has a positive refractive power or a negative refractive power, and wherein, TTL/ImgH<2.6, and 0.8<TTL/f<1.1, where TTL is a distance from the object side surface of the first lens to the image plane on the optical axis, ImgH is half a diagonal length of an effective pixel area on the image plane, and f is a total effective focal length of the iris lens assembly.

2. The iris lens assembly according to claim 1, wherein at least one of an image side surface and the object side surface of the second lens is a smoothly meniscus-curved surface.

3. The iris lens assembly according to claim 1, wherein an aperture diaphragm is arranged between the first lens and the second lens.

4. The iris lens assembly according to claim 1, wherein an effective radius of the image side surface of the first lens DT12 and the effective radius of the object side surface of the second lens DT21 satisfy: 1≤DT12/DT21<1.5.

5. The iris lens assembly according to claim 1, wherein a center thickness of the first lens on the optical axis CT1 and the distance from the object side surface of the first lens to the image plane on the optical axis TTL satisfy: 0.1<CT1/TTL<0.2.

6. The iris lens assembly according to claim 5, wherein the center thickness of the first lens on the optical axis CT1 and a center thickness of the third lens on the optical axis CT3 satisfy: 1<CT1/CT3<2.1.

7. The iris lens assembly according to claim 6, wherein an effective focal length of the second lens f2 and an effective focal length of the third lens f3 satisfy: |f2/f3|<0.4.

8. The iris lens assembly according to claim 7, wherein a radius of curvature of the object side surface of the first lens R1 and a radius of curvature of the image side surface of the first lens R2 satisfy: −2<(R1+R2)/(R1−R2)<−1.

9. The iris lens assembly according to claim 8, further comprising an infrared (IR) filter between the third lens and the image plane, wherein a bandpass wave band of the filter ranges from 750 nm to 900 nm.

* * * * *